(12) United States Patent
Yamazaki et al.

(10) Patent No.: US 8,441,209 B2
(45) Date of Patent: May 14, 2013

(54) LIGHTING DEVICE HAVING VARIABLE CURRENT SOURCE

(75) Inventors: Shunpei Yamazaki, Tokyo (JP); Jun Koyama, Kanagawa (JP)

(73) Assignee: Semiconductor Energy Laboratory Co., Ltd. (JP)

( * ) Notice: Subject to any disclaimer, the term of this patent is extended or adjusted under 35 U.S.C. 154(b) by 482 days.

(21) Appl. No.: 12/722,062

(22) Filed: Mar. 11, 2010

(65) Prior Publication Data

US 2010/0237805 A1 Sep. 23, 2010

(30) Foreign Application Priority Data

Mar. 18, 2009 (JP) ................................ 2009-066899

(51) Int. Cl.
*G05F 1/00* (2006.01)
(52) U.S. Cl.
USPC ........ 315/297; 315/291; 315/360; 315/169.2; 315/169.3; 345/76; 345/77; 345/98; 345/204; 345/690
(58) Field of Classification Search .... 315/169.1–169.3, 315/291, 297, 307, 312, 360; 345/63, 76, 345/77, 82, 84, 87, 90, 98, 204–207, 214, 345/690, 699
See application file for complete search history.

(56) References Cited

U.S. PATENT DOCUMENTS

| 5,965,981 | A  | 10/1999 | Inoguchi et al. |
| 6,225,552 | B1 | 5/2001  | Nishi et al. |
| 6,424,326 | B2 | 7/2002  | Yamazaki et al. |
| 6,565,231 | B1 | 5/2003  | Cok |
| 6,664,137 | B2 | 12/2003 | Weaver |
| 6,776,880 | B1 | 8/2004  | Yamazaki |
| 6,781,746 | B2 | 8/2004  | Yamazaki et al. |
| 6,787,990 | B2 | 9/2004  | Cok |
| 6,788,003 | B2 | 9/2004  | Inukai et al. |
| 6,940,223 | B2 | 9/2005  | Yamazaki |
| 7,053,874 | B2 | 5/2006  | Koyama |
| 7,075,226 | B2 | 7/2006  | Cok |
| 7,199,771 | B2 | 4/2007  | Yamazaki et al. |

(Continued)

FOREIGN PATENT DOCUMENTS

| EP | 1 881 743 A2 | 1/2008 |
| EP | 2 163 808 A1 | 3/2010 |

(Continued)

OTHER PUBLICATIONS

International Search Report re application No. PCT/JP2010/053181, dated Apr. 13, 2010.

(Continued)

*Primary Examiner* — Haiss Philogene
(74) *Attorney, Agent, or Firm* — Husch Blackwell LLP

(57) ABSTRACT

To provide a lighting device in which the luminance of an EL element is maintained even when the EL element deteriorates so that degradation of the lighting device is reduced, the lighting device includes a surface light source portion including an organic EL element, and a control circuit portion provided in a base portion. The control circuit portion counts a lighting time of the organic EL element and controls the luminance of the organic EL element in accordance with the lighting time. Accordingly, the lighting device in which the luminance of an EL element is maintained regardless of degradation of the EL element so that degradation of the lighting device is reduced can be provided.

24 Claims, 17 Drawing Sheets

U.S. PATENT DOCUMENTS

| | | | |
|---|---|---|---|
| 7,248,235 B2 * | 7/2007 | Fujii et al. | 345/76 |
| 7,307,607 B2 | 12/2007 | Osame et al. | |
| 7,330,162 B2 * | 2/2008 | Yamazaki et al. | 345/82 |
| 7,378,133 B2 | 5/2008 | Yamazaki et al. | |
| 7,517,551 B2 | 4/2009 | Arai | |
| 7,528,812 B2 * | 5/2009 | Tsuge et al. | 345/78 |
| 7,696,961 B2 * | 4/2010 | Koyama | 345/76 |
| 7,943,443 B2 | 5/2011 | Yamazaki et al. | |
| 8,168,483 B2 | 5/2012 | Yamazaki et al. | |
| 2004/0031442 A1 | 2/2004 | Yamazaki et al. | |
| 2004/0150594 A1 | 8/2004 | Koyama et al. | |
| 2004/0227460 A1 | 11/2004 | Liao et al. | |
| 2005/0016462 A1 | 1/2005 | Yamazaki | |
| 2005/0258436 A1 | 11/2005 | Arai | |
| 2006/0139254 A1 | 6/2006 | Hayakawa et al. | |
| 2008/0029023 A1 | 2/2008 | Ikeda et al. | |
| 2008/0085652 A1 | 4/2008 | Winters | |
| 2008/0180936 A1 | 7/2008 | Ogashiwa | |
| 2008/0251376 A1 | 10/2008 | Takizawa et al. | |
| 2009/0074952 A1 | 3/2009 | Yamazaki et al. | |
| 2009/0269486 A1 | 10/2009 | Yamazaki et al. | |
| 2009/0293808 A1 | 12/2009 | Yamazaki | |
| 2010/0096992 A1 | 4/2010 | Yamamoto et al. | |
| 2010/0236691 A1 | 9/2010 | Yamazaki | |
| 2010/0237373 A1 | 9/2010 | Yamazaki et al. | |
| 2010/0237774 A1 | 9/2010 | Yamazaki et al. | |
| 2012/0214263 A1 | 8/2012 | Yamazaki et al. | |

FOREIGN PATENT DOCUMENTS

| | | | |
|---|---|---|---|
| JP | 2000-057384 | * | 2/2000 |
| JP | 2000-313959 | | 11/2000 |
| JP | 2001-102170 | | 4/2001 |
| JP | 2002-117986 | | 4/2002 |
| JP | 2003-29709 | | 1/2003 |
| JP | 2004-70349 | | 3/2004 |
| JP | 2005-325428 | | 11/2005 |
| JP | 2005-325433 | | 11/2005 |
| JP | 2005-332773 | | 12/2005 |
| JP | 2006-222376 | | 8/2006 |
| JP | 3883854 B2 | | 2/2007 |
| JP | 2007-63590 | | 3/2007 |
| JP | 2007-115594 | | 5/2007 |
| JP | 2007-173424 | | 7/2007 |
| JP | 2007-173520 | | 7/2007 |
| JP | 2007-188647 | | 7/2007 |
| JP | 2007-227523 | | 9/2007 |
| JP | 2008-41650 | | 2/2008 |
| JP | 2008-293753 | | 12/2008 |

OTHER PUBLICATIONS

Written Opinion re application No. PCT/JP2010/053181, dated Apr. 13, 2010.

* cited by examiner

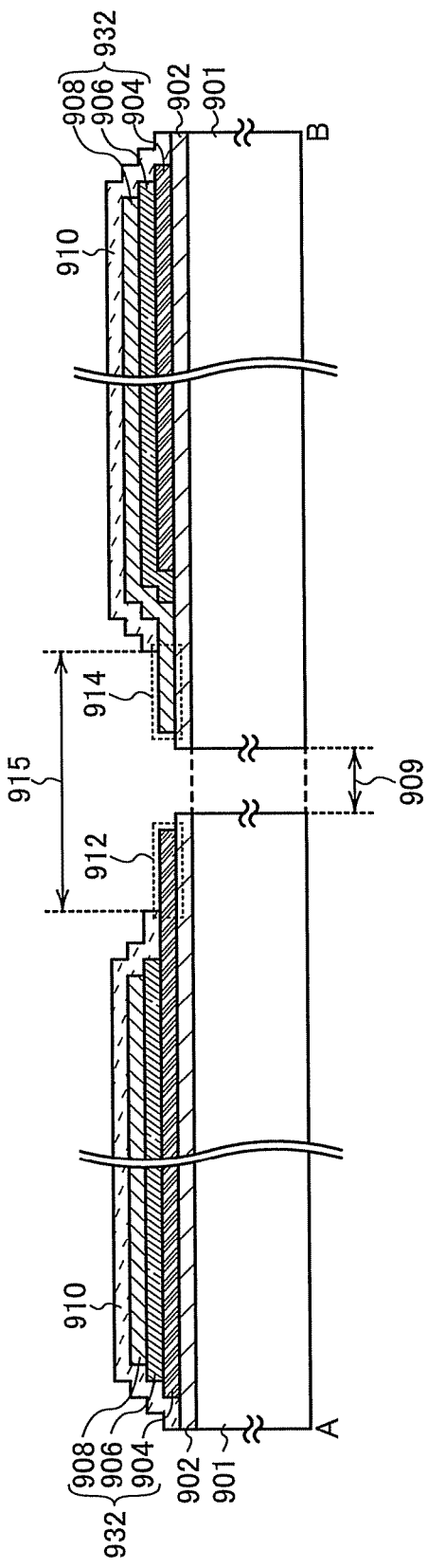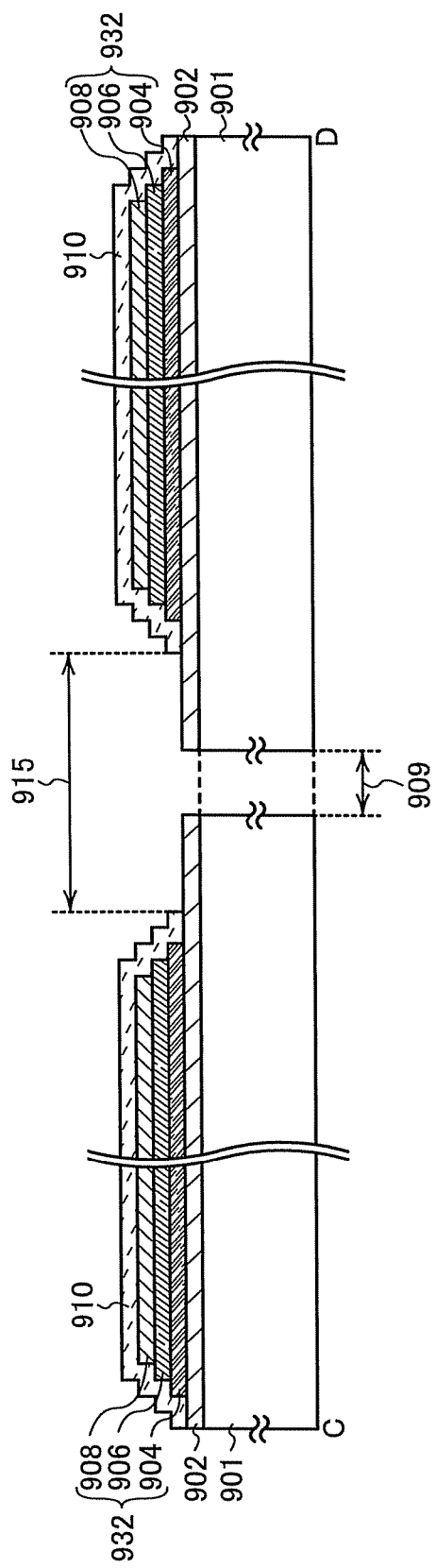

LIGHTING DEVICE HAVING VARIABLE CURRENT SOURCE

TECHNICAL FIELD

The present invention relates to a lighting device. The present invention particularly relates to a lighting device using a light-emitting element which includes a layer containing a light-emitting substance with which electroluminescence (hereinafter referred to as EL) can be obtained.

BACKGROUND ART

Since awareness of environmental problems has been raised, lighting devices including LEDs instead of incandescent lamps have been actively developed and commercialized. Moreover, in recent years, a lighting device using an organic EL element (hereinafter referred to as an EL element) which is a surface light source has also been developed (e.g., see Patent Document 1).

REFERENCE

Patent Document 1: Japanese Published Patent Application No. 2007-227523

DISCLOSURE OF INVENTION

Luminance characteristics of an EL element are changed as lighting time accumulated (referred to as accumulated lighting time) is increased. In other words, when current is supplied with a given voltage to a deteriorating EL element and an EL element that does not deteriorate, luminance difference occurs between these EL elements. Accordingly, although a lighting device including an EL element is a very promising lighting device as a surface light source, it is still susceptible of improvement.

An object of one embodiment of the present invention is to provide a lighting device in which the luminance of an EL element is maintained, even when the EL element deteriorates, so that degradation of the lighting device is reduced.

One embodiment of the present invention is a lighting device as follows. The lighting device includes a surface light source portion including an organic EL element, and a control circuit portion provided in a base portion. The control circuit portion includes a luminance adjustment circuit configured to store an accumulated lighting time obtained by counting a lighting time of the organic EL element and control luminance of the organic EL element in accordance with the accumulated lighting time.

One embodiment of the present invention is a lighting device as follows. The lighting device includes a surface light source portion including an organic EL element, and a control circuit portion provided in a base portion. The control circuit portion includes a rectifier and smoothing circuit configured to convert an alternating-current power supply voltage into a pulsating direct-current voltage; a constant voltage circuit configured to convert the direct-current voltage obtained by the rectifier and smoothing circuit into a constant voltage signal; a luminance adjustment circuit configured to store an accumulated lighting time obtained by counting a lighting time of the organic EL element in accordance with the constant voltage signal output from the constant voltage circuit, and output degradation correction data corresponding to the accumulated lighting time; and a variable current source circuit configured to supply a current to the organic EL element by control of the luminance adjustment circuit.

One embodiment of the present invention is a lighting device as follows. The lighting device includes a surface light source portion including an organic EL element, and a control circuit portion provided in a base portion. The control circuit portion includes a rectifier and smoothing circuit configured to convert an alternating-current power supply voltage into a pulsating direct-current voltage; a constant voltage circuit configured to convert the direct-current voltage obtained by the rectifier and smoothing circuit into a constant voltage signal; a luminance adjustment circuit; and a variable current source circuit configured to supply a current to the organic EL element by control of the luminance adjustment circuit. The luminance adjustment circuit includes a lighting time measurement circuit configured to count a lighting time of the organic EL element in accordance with the constant voltage signal output from the constant voltage circuit; an accumulated lighting time storage portion configured to store an accumulated lighting time obtained by accumulating the lighting time; a degradation correction storage circuit portion configured to store a degradation correction table including degradation correction data with which luminance of the organic EL element is set to predetermined luminance in response to the accumulated lighting time; and a correction circuit configured to update and read the accumulated lighting time, and read and output the degradation correction data corresponding to the accumulated lighting time.

In the lighting device, which is one embodiment of the present invention, the luminance adjustment circuit has a function of controlling the luminance of the organic EL element in response to a signal from a temperature sensor.

In the lighting device, which is one embodiment of the present invention, the luminance adjustment circuit includes a luminance setting circuit and has a function of controlling the luminance of the organic EL element in response to the luminance level set by the luminance setting circuit.

In the lighting device, which is one embodiment of the present invention, the surface light source portion has a round shape.

In the lighting device, which is one embodiment of the present invention, the surface light source portion and the control circuit portion can be attached to and detached from each other.

According to one embodiment of the present invention, a lighting device in which the luminance of an EL element is maintained regardless of degradation of the EL element so that degradation of the lighting device is reduced can be provided.

BRIEF DESCRIPTION OF DRAWINGS

In the accompanying drawings:

FIGS. 10A and 10B illustrate the detail of a lighting device;

BEST MODE FOR CARRYING OUT THE INVENTION

Figure 1A:
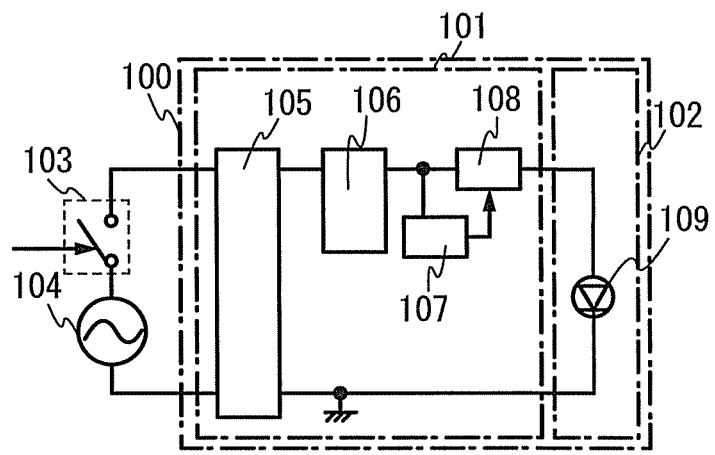
FIGS. 1A, 1B, and 1C are a circuit diagram, a perspective view, and a schematic diagram for illustrating a lighting device.

Hereinafter, embodiments of the present invention will be described with reference to the accompanying drawings. The present invention can be implemented in various modes, and it is easily understood by those skilled in the art that modes and details disclosed herein can be modified in various ways without departing from the spirit and the scope of the present invention. Accordingly, the present invention is not construed as being limited to the description of the embodiments. Note that in the drawings in this specification, the same portions or portions having similar functions will be denoted by the same reference numerals, and the description is not repeated.

Note that the size, the thickness of a layer, or the like of each structure illustrated in drawings or the like in embodiments is sometimes exaggerated for simplicity. Therefore, embodiments of the present invention are not limited to such scales.

Note that terms such as "first", "second", and "third" in this specification are used in order to avoid confusion among components, and the terms do not limit the components numerically.

Embodiment 1

FIG. 1A illustrates a structure of a block diagram of a lighting device. A lighting device 100 illustrated in FIG. 1A includes a control circuit portion 101 and a surface light source portion 102. A power supply voltage is supplied from an alternating-current power supply 104 to the control circuit portion 101 through a lighting switch 103. The control circuit portion 101 includes a rectifier and smoothing circuit 105, a constant voltage circuit 106 (also referred to as a stabilization circuit), a luminance adjustment circuit 107, and a variable current source circuit 108. Moreover, the surface light source portion 102 includes a light-emitting element 109.

In the lighting device 100 in FIG. 1A, an alternating-current voltage output from a power supply (an alternating-current power supply) is made to pulsate by the rectifier and smoothing circuit 105 in the control circuit portion 101, and a direct-current voltage with ripples (also referred to as a pulsating direct-current voltage) is supplied to the constant voltage circuit 106. The constant voltage circuit 106 in the control circuit portion 101 converts the direct-current voltage with ripples or noise from the rectifier and smoothing circuit 105 into a stabilized constant voltage signal. The luminance adjustment circuit 107 in the control circuit portion 101 counts the lighting time of the light-emitting element 109 in accordance with the constant voltage signal of the constant voltage circuit 106, stores the lighting time as the accumulated lighting time, and adjusts a current value output from the variable current source circuit 108 in accordance with the accumulated lighting time. Moreover, the luminance of the light-emitting element 109 (the EL element) can be maintained regardless of degradation of the EL element due to accumulated lighting time, and degradation of the lighting device can be reduced.

Note that the lighting device 100 may have a structure where the control circuit portion 101 and the surface light source portion 102 can be attached to and detached from each other. With the structure where the surface light source portion 102 is detachable, the light-emitting element 109 which has a limited life due to deterioration of luminance over time can be replaced, and the control circuit portion 101 can be used again.

The lighting switch 103 has a function of controlling lighting and non-lighting or adjusting the luminance of the surface light source portion 102. The lighting switch 103 may be controlled by a home appliance network or the like, or controlled by a human. Moreover, the lighting switch 103 may have a function of controlling the direction or the like of the lighting device 100. Furthermore, the lighting switch 103 may be integrated with the lighting device 100.

Note that description is made on the assumption that the alternating-current power supply 104 is a commercial alternating-current power supply; alternatively, a power supply voltage generated by a photoelectric conversion device (also referred to as a solar battery), a power supply voltage generated by an electric generator, or the like may be used. Alternatively, a power supply of direct-current voltage (also referred to as a direct-current power supply) such as a secondary battery may be used. When a direct-current power supply is used instead of an alternating-current power supply, the rectifier and smoothing circuit 105 can be eliminated.

The rectifier and smoothing circuit 105 includes a rectifier circuit and a smoothing circuit, and is a circuit for converting alternating-current voltage into direct-current voltage. In the rectifier and smoothing circuit 105, the rectifier circuit may be formed using a diode and the smoothing circuit may be formed using a capacitor, for example. Moreover, the rectifier circuit including a diode may be a full-wave rectifier circuit or a half-wave rectifier circuit, and may be constituted by a circuit using a diode bridge (hereinafter referred to as a diode bridge circuit), a full-wave rectifier circuit using a transformer, or the like. Note that an alternating-current signal from an alternating-current power supply may be rectified and smoothed after the amplitude of the alternating-current signal is converted through a transformer or the like.

The constant voltage circuit 106 is a circuit having a function of outputting a direct-current voltage with ripples as a constant voltage signal. For example, the constant voltage circuit 106 may be constituted by a series regulator, a switching regulator, or the like. Moreover, a circuit included in the constant voltage circuit 106 may be formed using a semiconductor element such as a transistor. The use of a semiconductor element such as a transistor makes it easy to reduce the size of the circuit. Note that a transistor is an element having at least three terminals of a gate, a drain, and a source. The transistor has a channel region between a drain region and a source region, and current can flow through the drain region, the channel region, and the source region. Note that a transistor may be an element having at least three terminals of a base, an emitter, and a collector.

The luminance adjustment circuit 107 has functions of measuring a lighting state of the surface light source portion 102 all the time or at regular intervals (e.g., every one minute), counting the accumulated lighting time on the basis of data on the lighting state, and outputting a correction value obtained by calculation based on the accumulated lighting time to the variable current source circuit 108. Here, the accumulated lighting time counted is sequentially stored in a storage circuit portion (also referred to as a memory portion) in the luminance adjustment circuit 107 as data. An arithmetic circuit in the luminance adjustment circuit 107 takes in the accumulated lighting time from the storage circuit portion at regular intervals (e.g., every one hour), compares the accumulated lighting time with a degradation correction table which is separately stored, and obtains degradation correction data with which the luminance of the light-emitting element 109 in the surface light source portion 102 is set to predetermined luminance. The degradation correction data is output to the variable current source circuit 108 through a D/A converter or the like.

The variable current source circuit 108 has a function of supplying current in response to the accumulated lighting time to the light-emitting element 109 on the basis of the signal obtained in the luminance adjustment circuit 107. A circuit included in the variable current source circuit 108 may be formed using a semiconductor element such as a transistor.

The light-emitting element 109 has a structure where an organic EL layer is sandwiched between a first electrode and a second electrode.

FIG. 1A illustrates one light-emitting element 109; alternatively, a plurality of light-emitting elements 109 may be provided so as to be electrically connected in series and/or in parallel.

Figure 1B:
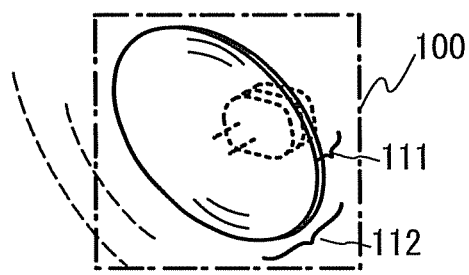
Figure 1C:
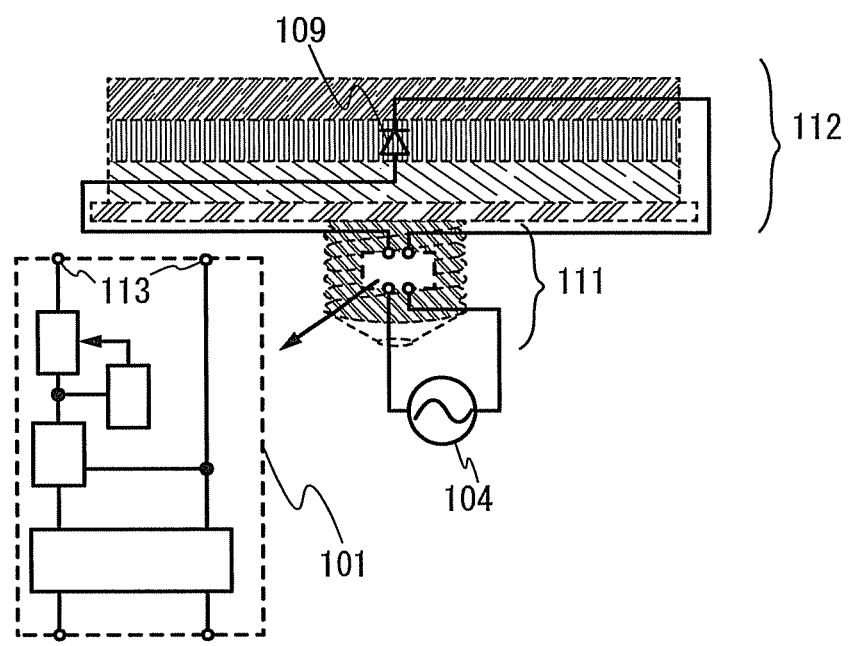

Next, FIG. 1B is a simple perspective view of the appearance of the lighting device 100. The lighting device 100 is roughly divided into a base portion 111 and a round-shaped light source portion 112. The shape of the base portion 111 is designed depending on standards of an incandescent lamp or the like. Note that the base portion 111 and the round-shaped light source portion 112 are connected through two terminal portions. The size of the round-shaped light source portion 112 is preferably approximately 12 cm in consideration of productivity or the like. As illustrated in a cross-sectional view in FIG. 1C, the control circuit portion 101 illustrated in FIG. 1A is provided inside the base portion 111. When the control circuit portion 101 is provided inside the base portion 111, the size of the lighting device 100 can be reduced and the space can be saved. Further, FIG. 1C illustrates a view in which the organic EL layer is sandwiched between the first electrode and the second electrode in the round-shaped light source portion 112 as described above, and correspondence between the cross-sectional view in FIG. 1C and the block diagram in FIG. 1A. In other words, as is clear from FIG. 1C, the control circuit portion 101 is included in the base portion 111, and the round-shaped light source portion 112 corresponds to the surface light source portion 102. Note that direct-current signals are supplied to two terminal portions 113 inside the control circuit portion 101 in FIG. 1C by the control circuit portion 101 in the base portion 111, so that one terminal serves as an anode and the other terminal serves as a cathode.

Figure 2A:
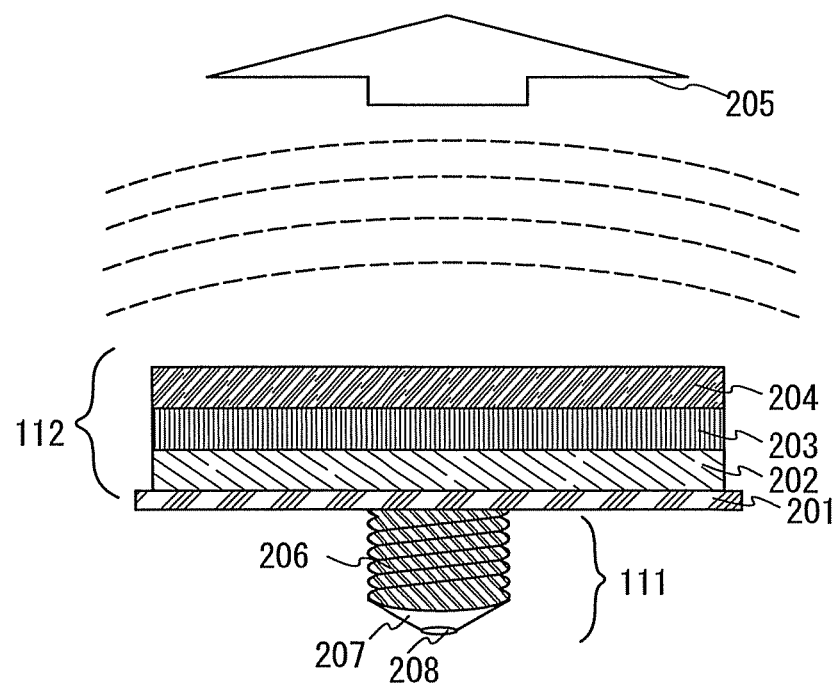
FIGS. 2A and 2B are cross-sectional views each illustrating a lighting device.

Here, structures of the round-shaped light source portion 112 and the base portion 111 which are illustrated in FIGS. 1B and 1C are described. FIG. 2A is a cross-sectional view of the lighting device 100 and illustrates the base portion 111 and the round-shaped light source portion 112 as in FIG. 1C. For example, the round-shaped light source portion 112 includes a first electrode 202 over a substrate 201, an organic EL layer 203 over the first electrode 202, and a second electrode 204 over the organic EL layer 203. For example, the base portion 111 includes a base 206 (also referred to as a first electrode), an insulating portion 207, and an electrode 208 (also referred to as a second electrode).

Figure 2B:
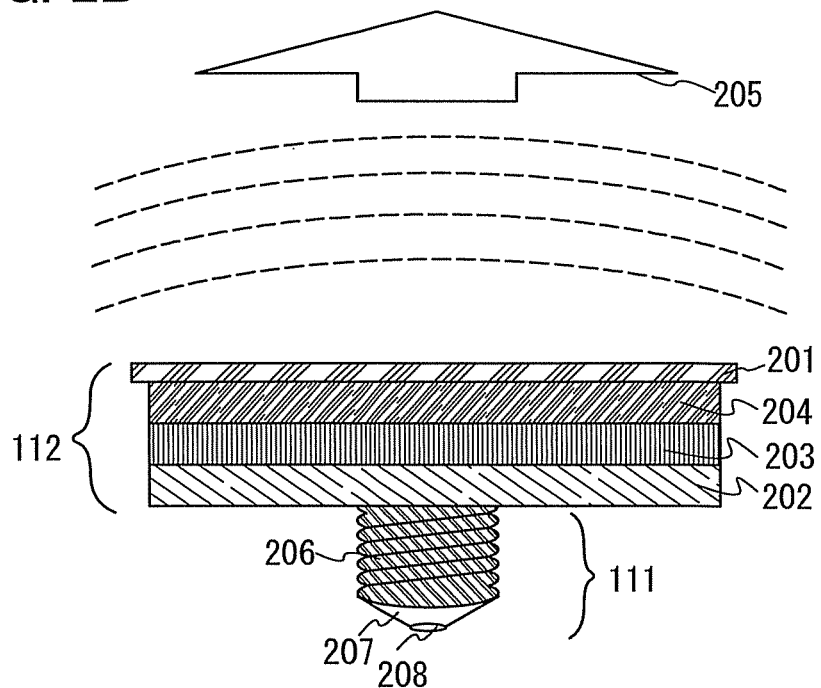

In the round-shaped light source portion 112, the substrate 201 may be a light-transmitting substrate. For the first electrode 202 (also referred to as the anode), a metal, an alloy, an electrically conductive compound, a mixture of these materials, or the like which has a high work function (specifically, a work function of 4.0 eV or higher is preferable) may be used. The organic EL layer 203 includes at least a light-emitting layer, and may have a layered structure including a functional layer other than the light-emitting layer. For the second electrode 204 (also referred to as the cathode), a metal, an alloy, an electrically conductive compound, a mixture of these materials, or the like which has a light-transmitting property and a low work function (specifically, a work function of 3.8 eV or less is preferable) may be used. Moreover, in the round-shaped light source portion 112, light 205 is emitted from the organic EL layer 203 through the second electrode 204 with a light-transmitting property. Note that as illustrated in FIG. 2B, the second electrode 204, the organic EL layer 203, and the first electrode 202 may be stacked in this order from the substrate 201 side and the light 205 may be emitted through the substrate 201 and the second electrode 204. In the structure in FIG. 2B, the substrate 201 is preferably formed using a light-transmitting material. Note that the layered structure of the first electrode 202, the organic EL layer 203, and the second electrode 204 corresponds to the light-emitting element 109 in the lighting device 100.

Note that in FIGS. 2A and 2B, the structure where the first electrode 202, the organic EL layer 203, and the second electrode 204 are stacked over the substrate 201 is described as an example of the round-shaped light source portion 112; alternatively, an electrode for increasing the light extraction efficiency may be added and/or the first electrode 202 and/or the second electrode 204 may be made uneven. Further, an insulating film may be provided over the substrate 201.

Note that FIGS. 2A and 2B illustrate the structure of a screw (screw-in) base as an example of the base portion 111; alternatively, a plug-in base may be used. Moreover, arrangement, the shape, or the like of the first electrode and the second electrode may be changed as appropriate depending on standards of the base or the like.

Figure 3:
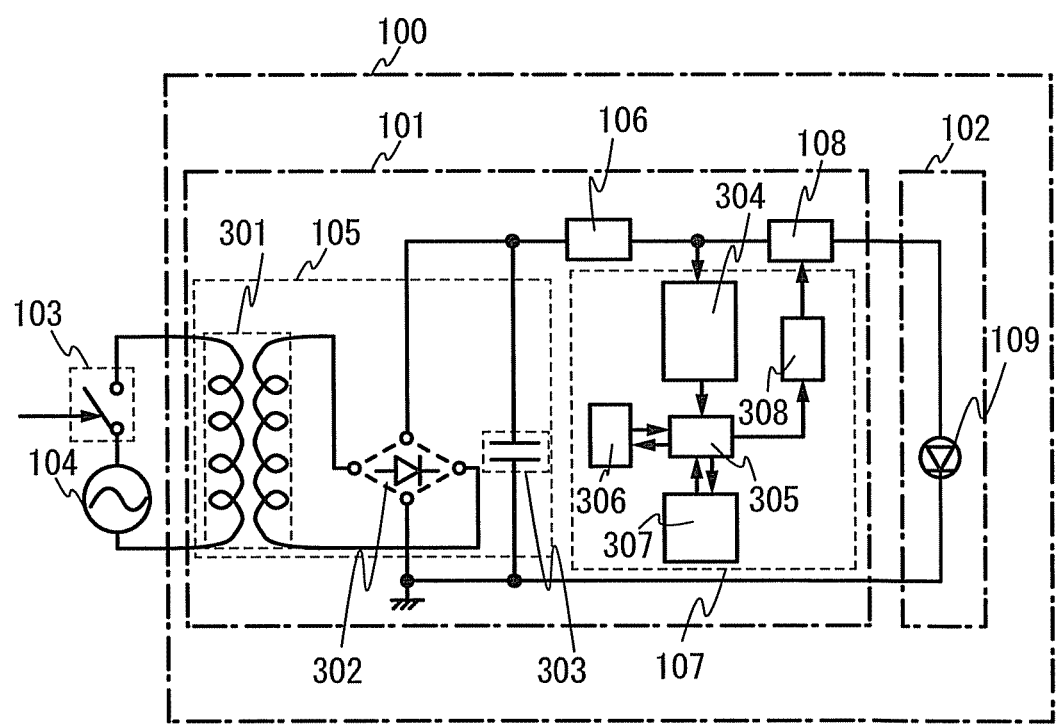
FIG. 3 is a circuit diagram illustrating a lighting device.

FIG. 3 illustrates the details of the structure of the block diagram of the lighting device 100 illustrated in FIG. 1A. Like the lighting device 100 illustrated in FIG. 1A, the lighting device 100 in FIG. 3 includes the control circuit portion 101 and the surface light source portion 102. As in the case of the control circuit portion 101 illustrated in FIG. 1A, a power supply voltage is supplied from the alternating-current power supply 104 to the control circuit portion 101 in FIG. 3 through the lighting switch 103. Like the control circuit portion 101 in FIG. 1A, the control circuit portion 101 in FIG. 3 includes the rectifier and smoothing circuit 105, the constant voltage circuit 106, the luminance adjustment circuit 107, and the variable current source circuit 108. Like the surface light source portion 102 in FIG. 1A, the surface light source portion 102 in FIG. 3 includes the light-emitting element 109. The rectifier and smoothing circuit 105 includes a transformer 301 (also referred to as a transformer circuit), a rectifier circuit 302, and a capacitor 303. The luminance adjustment circuit 107 includes a lighting time measurement circuit 304, a correction circuit 305, an accumulated lighting time storage portion 306, a degradation correction storage circuit portion 307, and a D/A converter 308.

In the lighting device 100 illustrated in FIG. 3, an alternating-current voltage is stepped up or down by the transformer 301 in the rectifier and smoothing circuit 105. The alternating-current voltage from the transformer 301 is converted into a pulsating direct-current voltage by the rectifier circuit 302 and the capacitor 303 in the rectifier and smoothing circuit 105, and the direct-current voltage with ripples is supplied to the constant voltage circuit 106. The constant voltage circuit 106 in the control circuit portion 101 converts the direct-current voltage with ripples or noise from the rectifier and smoothing circuit 105 into a stabilized constant voltage signal. The lighting time measurement circuit 304 in the luminance adjustment circuit 107 counts the lighting time of the light-emitting element 109 in accordance with the output voltage of the constant voltage circuit 106, and measures the lighting time. The correction circuit 305 in the luminance adjustment circuit 107 adds the measured lighting time to the accumulated lighting time which is stored in the accumulated lighting time storage portion 306, and updates the accumulated lighting time. Then, the correction circuit 305 in the luminance adjustment circuit 107 reads degradation correction data by comparing a degradation correction table which is stored in the degradation correction storage circuit portion 307 with the accumulated lighting time, and outputs the degradation correction data to the D/A converter 308. The D/A converter 308 in the luminance adjustment circuit 107 outputs an analog voltage Vc corresponding to the degradation correction data. Then, the variable current source circuit 108 supplies a current corresponding to the analog voltage Vc to the light-emitting element 109.

Figure 4A:
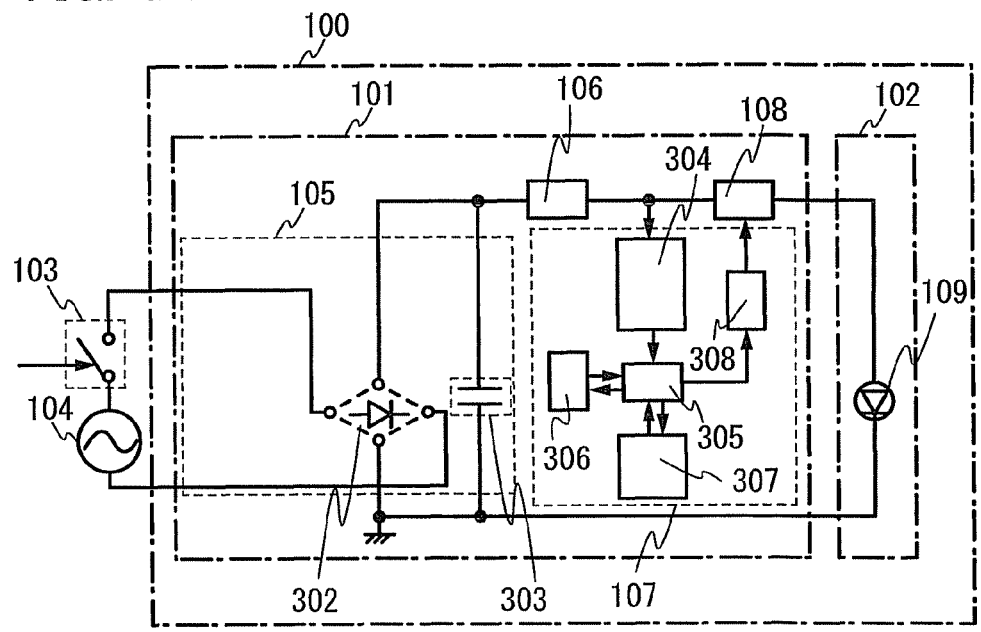
FIGS. 4A and 4B are circuit diagrams each illustrating a lighting device.

Note that the transformer 301 is illustrated in FIG. 3; however, the transformer 301 is not necessarily provided in the control circuit portion 101 depending on a voltage from the alternating-current power supply 104. For example, as illustrated in FIG. 4A, a voltage from the alternating-current power supply 104 may be supplied to the rectifier circuit 302 through the lighting switch 103.

The rectifier circuit 302 has a function of rectification and may be formed using a diode. Moreover, the rectifier circuit including a diode may be a full-wave rectifier circuit or a half-wave rectifier circuit, and may be constituted by a diode bridge circuit or a full-wave rectifier circuit using a transformer, for example. The capacitor 303 is an element having a function of smoothing a voltage which has been subjected to full-wave rectification or half-wave rectification.

Figure 4B:
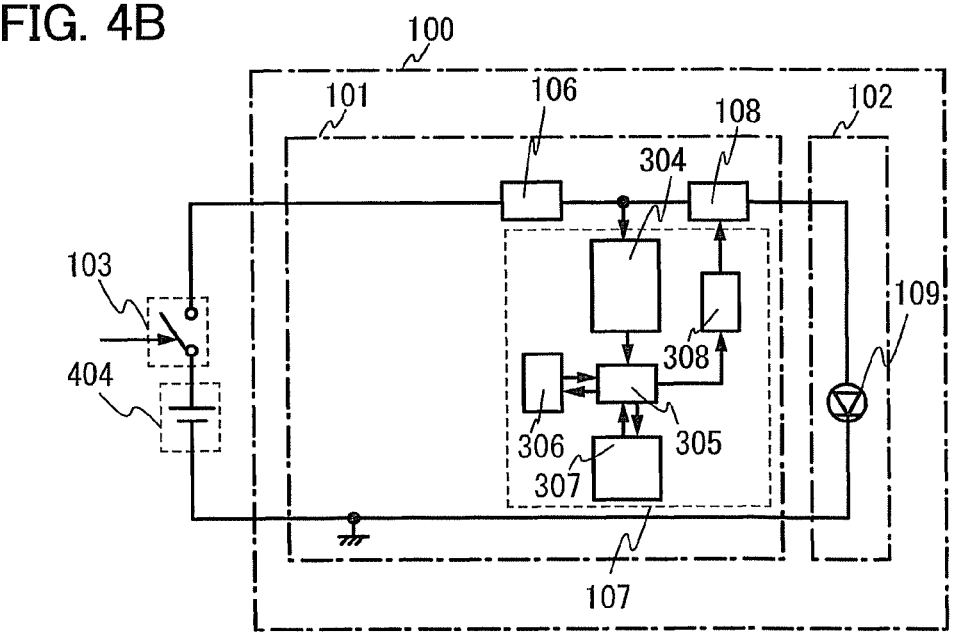

The rectifier and smoothing circuit in the lighting device 100 can be eliminated when power is supplied from a direct-current power supply 404 as illustrated in FIG. 4B. Note that in the control circuit portion 101, whether or not power from the outside is supplied through the rectifier and smoothing circuit may be switched depending on whether the power is supplied from a direct-current power supply or an alternating-current power supply.

The lighting time measurement circuit 304 has functions of measuring a lighting state of the surface light source portion 102 all the time or at regular intervals, counting the accumulated lighting time on the basis of data on the lighting state, and outputting a signal corresponding to the accumulated lighting time to the correction circuit 305. For example, the lighting time measurement circuit 304 includes an oscillator circuit and a counter circuit. The lighting time measurement circuit 304 samples output voltage from the constant voltage circuit 106 at regular intervals, and outputs a count value corresponding to an oscillation signal from the fixed-frequency oscillator circuit to the correction circuit 305 as the lighting time.

The correction circuit 305 has functions of making the accumulated lighting time storage portion 306 store a signal corresponding to the count value in the lighting time measurement circuit 304 as the lighting time, and adding the lighting time by reading the lighting time which is stored in the accumulated lighting time storage portion 306 at regular intervals and updating the accumulated lighting time. Moreover, the correction circuit 305 has functions of reading degradation correction data by comparing a degradation correction table which is stored in the degradation correction storage circuit portion 307 with the accumulated lighting time, and outputting the degradation correction data to the D/A converter 308.

The accumulated lighting time storage portion 306 is a circuit that has a function of storing and holding data on the accumulated lighting time for accumulating the lighting time obtained by the correction circuit 305. Note that the accumulated lighting time storage portion 306 may be a volatile memory or a nonvolatile memory; in preparation of loss of data on the accumulated lighting time due to power failure or the like, it is preferable to employ a structure in which data is written in a nonvolatile memory at regular intervals.

The degradation correction storage circuit portion 307 has functions of storing a degradation correction table including degradation correction data with which the luminance of the light-emitting element 109 in the surface light source portion 102 is set to predetermined luminance in response to the accumulated lighting time which is read out by the correction circuit 305, and outputting degradation correction data in response to reading of the correction circuit 305.

Figure 8:
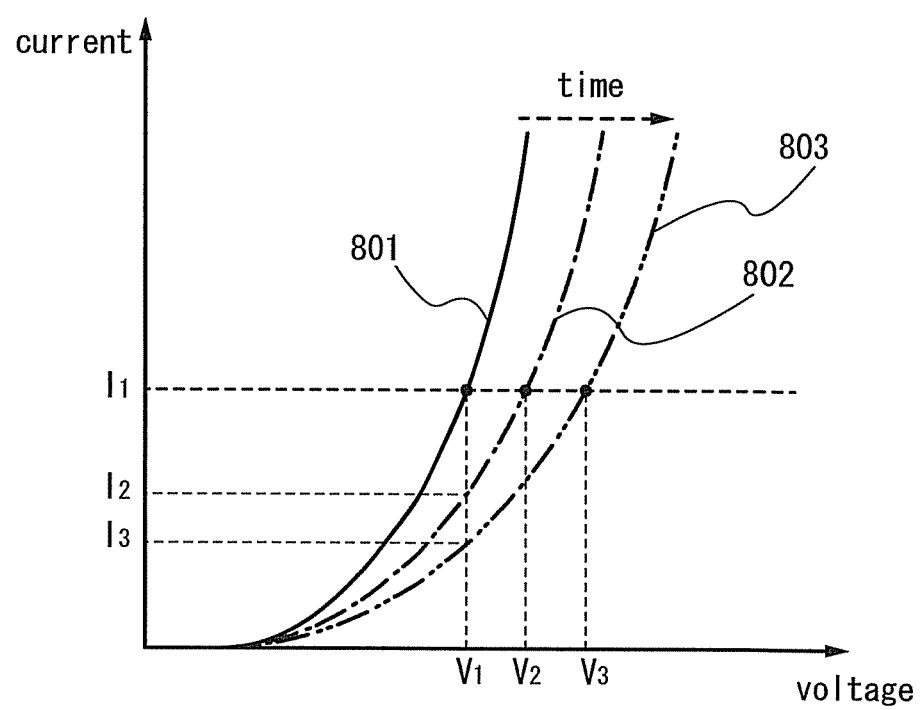
FIG. 8 illustrates characteristics of an EL element.

Here, the degradation correction table is described. The value of current flowing through an EL element which is the light-emitting element 109 with respect to applied voltage is changed as shown by a curve 801, a curve 802, and a curve 803 illustrated in FIG. 8, as the accumulated light time is increased. Accordingly, even when an initial characteristic where an applied voltage $V_1$ makes a current $I_1$ flow is represented by the curve 801, the characteristic of the EL element changes as shown by the curve 802 and the curve 803 as the accumulated light time is accumulated. Moreover, only a current less than the desired current $I_1$, such as a current $I_2$ and a current $I_3$, flows through the EL element. The luminance of the EL element depends on a current flowing therethrough. Reduction in current value flowing through the EL element leads to reduction in luminance and degradation of quality of the lighting device. Accordingly, in the degradation correction table, an applied voltage is set to $V_2$ or $V_3$ in advance depending on the accumulated lighting time. The degradation correction storage circuit portion 307 stores the degradation correction table in which an applied voltage is estimated to be increased in advance; thus, the desired current $I_1$ can flow through the EL element even when characteristics deteriorate as shown by the curve 802 or the curve 803, and degradation in luminance can be reduced. Note that when degradation of the EL element progresses because of another factor, a sensor or the like monitors the change, and the applied voltage is increased (or reduced) in advance and stored in the degradation correction storage circuit portion 307.

The D/A converter 308 is a circuit for outputting the analog voltage Vc corresponding to degradation correction data which is corrected so that the luminance of the light-emitting element 109 in the surface light source portion 102 is set to predetermined luminance.

Note that the accumulated lighting time storage portion 306 and the degradation correction storage circuit portion 307 may be provided in the correction circuit 305.

Figure 5A:
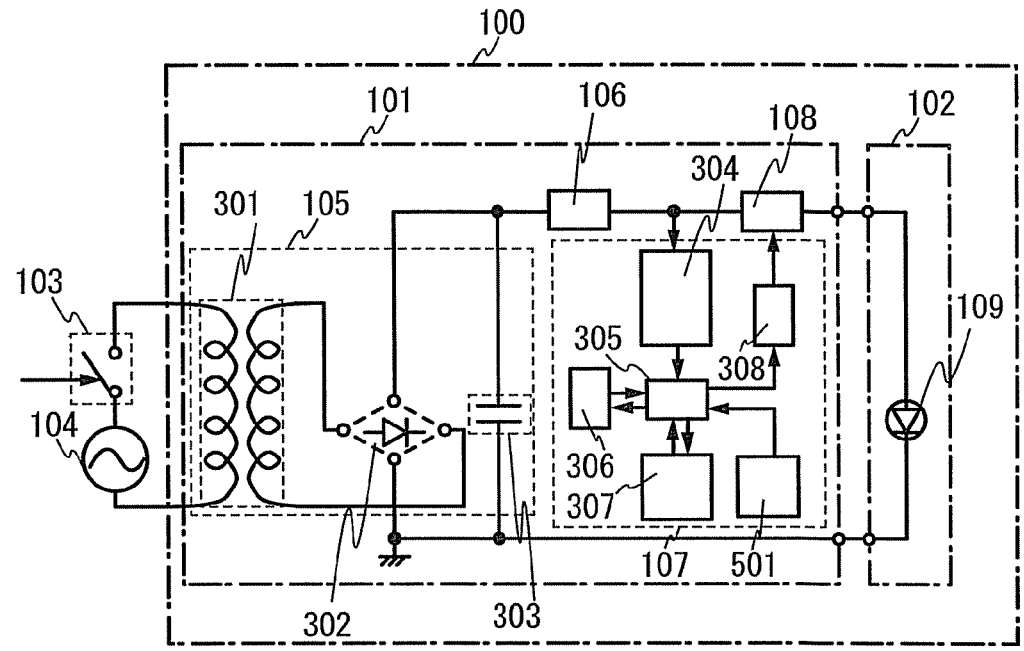
FIGS. 5A and 5B are circuit diagrams each illustrating a lighting device.

The luminance adjustment circuit 107 may include a temperature sensor. FIG. 5A illustrates a structure including a temperature sensor. A temperature sensor 501 measures ambient temperature at regular intervals (e.g., every one hour) and outputs a signal corresponding to the ambient temperature to the correction circuit 305. The correction circuit 305 has functions of reading degradation correction data for temperature change by comparing a degradation correction table for temperature change, which is stored in the degradation correction storage circuit portion 307, and outputting the degradation correction data for temperature change to the D/A converter 308. The degradation correction storage circuit portion 307 has functions of storing a degradation correction table for temperature change, with which the luminance of the light-emitting element 109 in the surface light source portion 102 is set to predetermined luminance, in response to a signal corresponding to the ambient temperature obtained by the correction circuit 305, and outputting degradation correction data for temperature change in response to reading of the correction circuit 305.

Note that when the lighting device is estimated to be used in an environment where ambient temperature is not changed much, for example, indoors only, correction by the temperature sensor is not necessarily performed. In addition, the degradation correction table, which is stored in the degradation correction storage circuit portion 307, may be a degradation correction table that includes a correction table corresponding to ambient temperature and a correction table corresponding to accumulated lighting time. Alternatively, correction data is read from different correction tables and operation may be performed in the correction circuit 305 to calculate correction data.

Figure 5B:
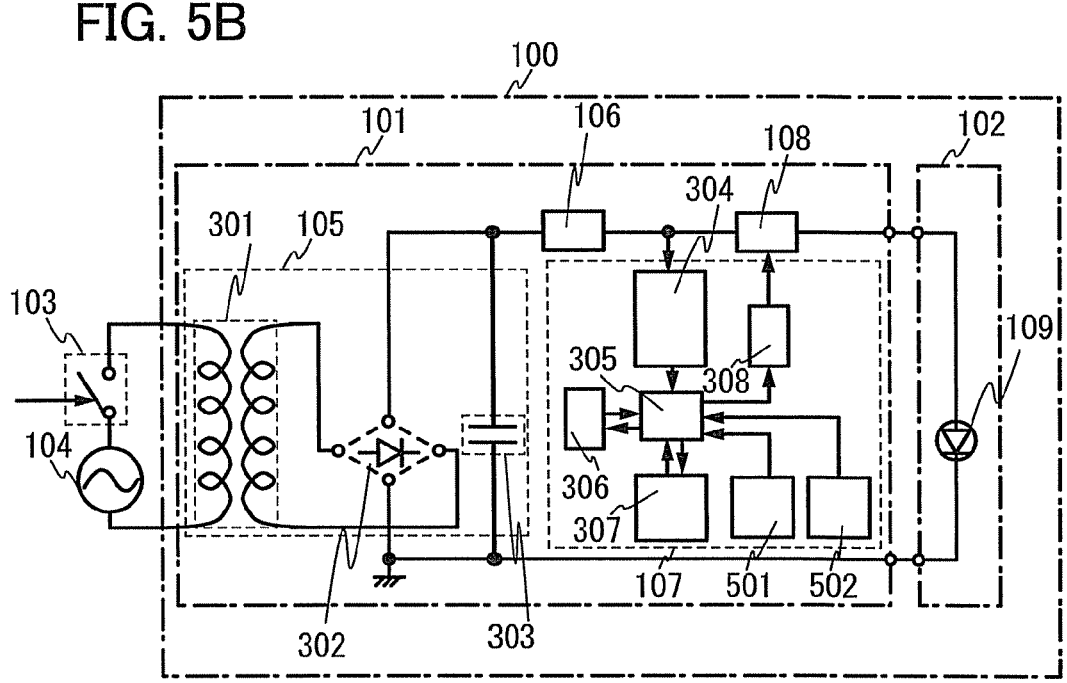

The luminance adjustment circuit 107 may include a luminance setting circuit 502 in addition to the temperature sensor. FIG. 5B illustrates a structure including the luminance setting circuit 502 in addition to the temperature sensor 501. The luminance setting circuit 502 outputs to the correction circuit 305 a signal corresponding to the luminance level in the case where a plurality of luminance levels are set for the light-emitting element 109 in the surface light source portion 102. The correction circuit 305 has functions of reading degradation correction data corresponding to luminance level by comparing a degradation correction table which corresponds to luminance level and is stored in the degradation correction storage circuit portion 307, and outputting the degradation correction data corresponding to luminance level to the D/A converter 308. The degradation correction storage circuit portion 307 has functions of storing a degradation correction table with which the luminance level of the light-emitting element 109 in the surface light source portion 102 is set to predetermined luminance level, and outputting degradation correction data corresponding to luminance level, in response to reading of the correction circuit 305.

The D/A converter 308 is a circuit for converting degradation correction data, which is digital data output from the correction circuit 305, into the analog voltage Vc (hereinafter referred to as a degradation correction voltage Vc).

Figure 6:
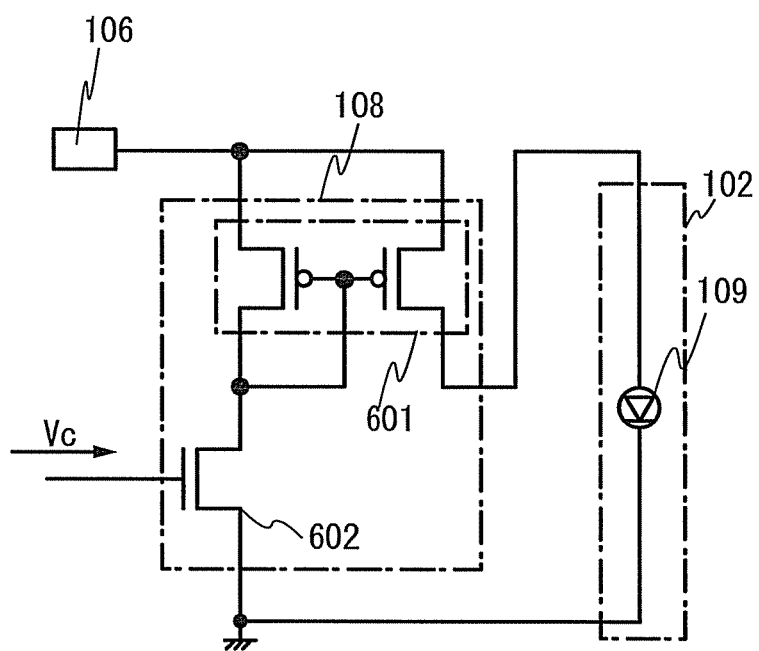
FIG. 6 is a circuit diagram illustrating a lighting device.

FIG. 6 illustrates an example of the variable current source circuit 108. The variable current source circuit 108 illustrated in FIG. 6 includes a current mirror circuit 601 and a transistor 602. The degradation correction voltage Vc is applied to a gate of the transistor 602 in FIG. 6, and a current flows between a source and a drain of the transistor 602 on the basis of the degradation correction voltage Vc. A current flowing through the transistor 602 flows through the current mirror circuit 601, whereby a current corresponding to the degradation correction voltage Vc can be supplied to the light-emitting element 109, and the luminance can be corrected.

Figure 7A:
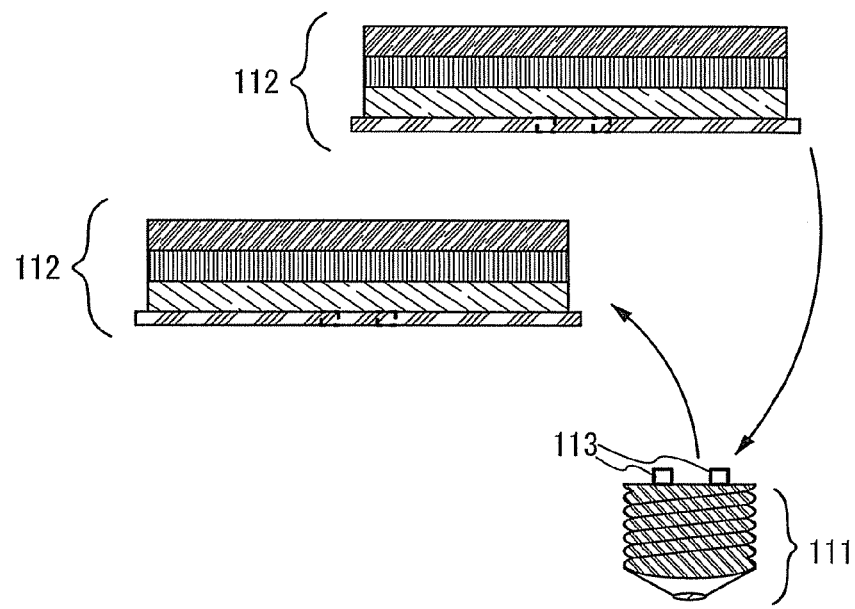
FIGS. 7A and 7B are a cross-sectional view and a circuit diagram for illustrating a lighting device.
Figure 7B:
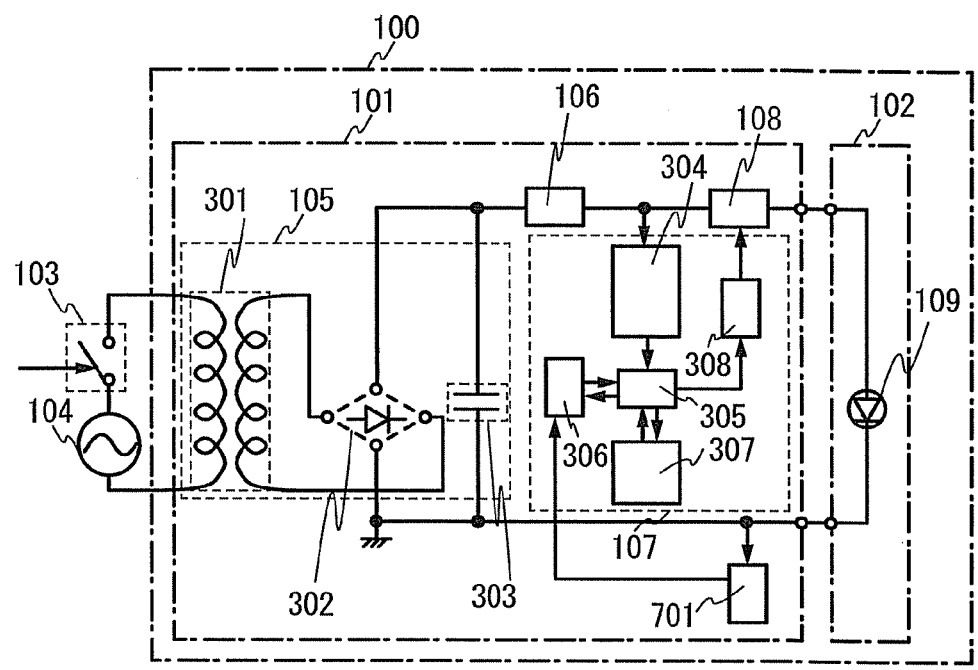

In the structure where the control circuit portion 101 and the surface light source portion 102 are detachable from each other, the base portion 111 and the round-shaped light source portion 112 are arranged so that they can be attached to and detached from each other at the terminal portions 113 as illustrated in FIG. 7A. The lighting device preferably has a function of resetting the accumulated lighting time in the luminance adjustment circuit 107 in the control circuit portion 101 when the round-shaped light source portion 112 is replaced as illustrated in FIG. 7A. As an example, FIG. 7B illustrates a structure of the luminance adjustment circuit 107 in the control circuit portion 101 in the case where the surface light source portion 102 is replaced. A circuit (a detachment detection circuit 701) which detects detachment of the surface light source portion 102 is provided, and the accumulated lighting time which is stored in the accumulated lighting time storage portion 306 is initialized on the basis of a signal from the detachment detection circuit 701. Note that instead of using the detachment detection circuit 701, the accumulated lighting time in the luminance adjustment circuit 107 in the control circuit portion 101 may be reset by manual control such as a mechanical switch.

As described above, one embodiment of the present invention is a structure in which a control circuit portion provided in a base portion of a lighting device counts a lighting time of an organic EL element and controls the luminance of the organic EL element in accordance with the lighting time. Accordingly, a lighting device in which the luminance of an EL element is maintained regardless of degradation of the EL element so that degradation of the lighting device is reduced can be provided.

This embodiment can be implemented in combination with any of the other embodiments as appropriate.

Embodiment 2

In this embodiment, an example of the round-shaped light source portion which is described in Embodiment 1 will be described with reference to drawings.

As an example, in a round-shaped light source portion shown in this embodiment, a first electrode, an organic EL layer, and a second electrode are stacked over a substrate having an opening portion at the center, and the center of the substrate has a first connection portion and a second connection portion.

Figure 9:
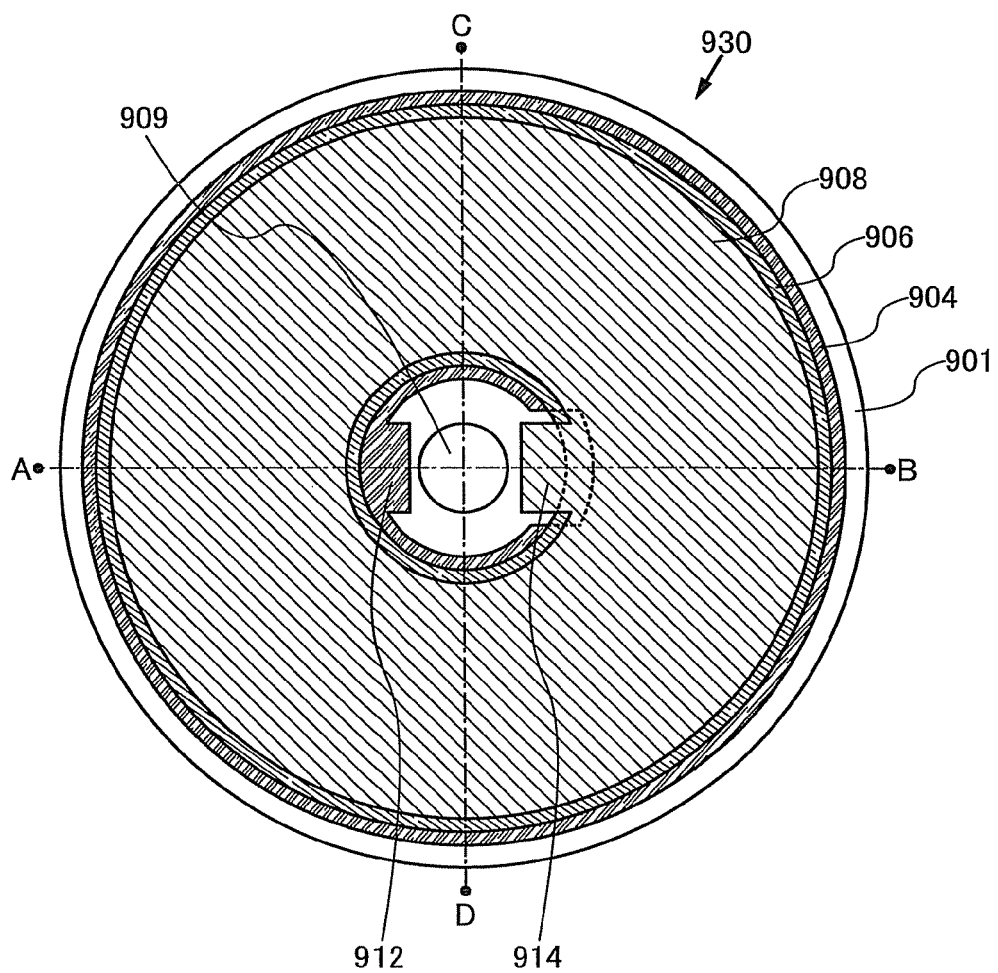
FIG. 9 illustrates the detail of a lighting device.

A specific structure will be described below with reference to FIG. 9 and FIGS. 10A and 10B. FIG. 9 is a plan schematic diagram of a round-shaped light source portion. FIG. 10A is a schematic diagram of a cross section along A-B in FIG. 9. FIG. 10B is a schematic diagram of a cross section along C-D in FIG. 9.

A round-shaped light source portion 930 illustrated in FIG. 9 and FIGS. 10A and 10B has an opening portion 909 at the center and includes a round-shaped substrate 901, a light-emitting element 932 provided over the substrate 901 with an insulating film 902 therebetween, an insulating film 910 provided so as to cover the light-emitting element 932, and a first connection portion 912 and a second connection portion 914 provided over the substrate 901.

The light-emitting element 932 has a layered structure of a first electrode 904, an organic EL layer 906, and a second electrode 908. Here, the case is shown in which the first electrode 904 is fowled over the substrate 901 with the insulating film 902 therebetween, the organic EL layer 906 is formed over the first electrode 904, and the second electrode 908 is formed over the organic EL layer 906.

The insulating film 910 has an opening portion 915 at the center of the substrate 901. The first connection portion 912 and the second connection portion 914 are provided in the opening portion 915. Note that the opening portion 915 in the insulating film 910 is formed so that the area of the opening portion 915 (the area of the opening portion in a plane which is parallel to a surface of the substrate 901) is larger than that of the opening portion 909 formed in the substrate 901.

The first connection portion 912 is provided using the first electrode 904 which is drawn out (extended) to the opening portion 915. The second connection portion 914 is provided using the second electrode 908 which is drawn out (extended) to the opening portion 915. In other words, part of the first electrode 904 is drawn out (extended) to the opening portion 915 in the insulating film 910 so that the first connection portion 912 is formed. Part of the second electrode 908 is drawn out (extended) to the opening portion 915 in the insulating film 910 so that the second connection portion 914 is formed.

The first electrode 904 and the second electrode 908, which are formed over the substrate 901, are drawn out in such a manner so that the first connection portion 912 and the second connection portion 914 are formed over the substrate 901; thus, the round-shaped light source portion can be thinned.

Moreover, the first electrode 904 and the second electrode 908, which are formed over the substrate 901, are used as the first connection portion 912 and the second connection portion 914, whereby the structure of the lighting device can be simplified and costs can be reduced.

Furthermore, the substrate 901 having the opening portion 909 is used and the first connection portion 912 and the second connection portion 914 are provided at the center (more specifically, in a region near the opening portion 909) of the substrate 901; thus, power can be supplied from the outside through the opening portion 909 formed in the substrate 901. Accordingly, in the round-shaped light source portion, power can be supplied to the light-emitting element 932 at one point (the center of the substrate).

In the structure illustrated in FIG. 9 and FIGS. 10A and 10B, an opening portion is also formed in the first electrode 904, the organic EL layer 906, and the second electrode 908 at the center of the substrate, as in the insulating film 910. Part of the second electrode 908 is drawn out to the opening portion found in the first electrode 904, the organic EL layer 906, and the insulating film 910, so that the second connection portion 914 is provided over the substrate 901. In that case, in a portion where part of the second electrode 908 is placed over (across) an edge portion of the first electrode 904 and an edge portion of the organic EL layer 906, the organic EL layer 906 can be provided so as to cover the edge portion of the first electrode 904 so that the first electrode 904 is not in contact with the second electrode 908.

Next, materials and the like included in the round-shaped light source portion in FIG. 9 and FIGS. 10A and 10B are specifically described.

The substrate 901 is a component on which a thin film can be deposited or a component on which a thin film has been deposited, and a disk-shaped (round-shaped) substrate having the opening portion 909 in the inside can be used. Specifically, a glass substrate, a ceramic substrate, a quartz substrate, or the like can be used. Alternatively, a plastic substrate made of polycarbonate, polyarylate, polyether sulfone, or the like can be used. Further alternatively, a film (made of polypropylene, polyester, vinyl, polyvinyl fluoride, vinyl chloride, or the like) or an inorganic film formed by evaporation can be used.

A flexible substrate may be used as the substrate 901. A flexible substrate refers to a substrate which can be bent. Alternatively, a metal (e.g., stainless steel alloy) substrate having a surface provided with an insulating film may be used. Other materials may also be used as long as they function as a support in a manufacturing process of the round-shaped light source portion 930.

Note that when light emitted from the light-emitting element 932 is extracted to the substrate 901 side, a material that transmits visible light is used for the substrate 901.

Moreover, the size of the substrate 901 can be set depending on application of the round-shaped light source portion 930. As an example, the substrate 901 can have substantially the same size as an optical disk such as a CD-R, which is preferable in terms of productivity or handling of a light-emitting device. For example, a disk-shaped plastic substrate which has a diameter of 10 cm to 14 cm, specifically a diameter of 12 cm and has a thickness of approximately 1.2 mm to 1.5 mm can be used. Alternatively, supports having a thickness of 0.5 mm to 0.7 mm may be attached to be used as the substrate 901. The diameter of the opening portion 909 provided in the substrate 901 can be 10 mm to 20 mm (e.g., 15 mm).

By using such a substrate, a disk-shaped lighting device which includes the opening portion at the center and has a diameter of 10 cm to 14 cm (e.g., 12 cm) and a thickness of approximately 1.2 mm to 2.0 mm can be manufactured.

Note that the case where the substrate 901 has a round shape is described in this embodiment; however, the shape of the substrate 901 is not limited to a round shape and may be an ellipse or a rectangle. Moreover, the shape of the opening portion 909 provided in the substrate 901 is not limited to a circle and may be an ellipse or a rectangle.

The insulating film 902 functions as a protective film for preventing diffusion of moisture and an impurity element from the substrate 901 into the light-emitting element 932. Particularly when plastic is used for the substrate 901, moisture diffused from the substrate 901 into the light-emitting element 932 can be reduced.

Examples of the insulating film 902 are a silicon oxide film, a silicon nitride film, a silicon oxynitride film, a silicon nitride oxide film, an aluminum oxide film, an aluminum nitride film, a magnesium oxide film, an yttrium oxide film, a hafnium oxide film, a tantalum oxide film, a zinc sulfide film, and a zinc sulfide film containing silicon oxide. A single-layer structure or a layered structure including any of these materials can be used. Such a film can be formed by a CVD method, a sputtering method, or the like.

The insulating film 902 may have a single-layer structure or a layered structure of two or three insulating films. Alternatively, the first electrode 904 may be provided on and in contact with the substrate 901 without formation of the insulating film 902.

Each of the first electrode 904 and the second electrode 908 functions as an electrode in the light-emitting element 932 and can be formed from a conductive film.

One of the first electrode 904 and the second electrode 908 functions as an anode of the light-emitting element 932, and the other functions as a cathode. The first electrode 904 may be used as the anode and the second electrode 908 may be used as the cathode. Alternatively, the first electrode 904 may be used as the cathode and the second electrode 908 may be used as the anode.

One of the first electrode 904 and the second electrode 908, which is used as the anode, is preferably formed using a substance with a high work function. Specifically, the electrode used as the anode can have a single-layer structure or a layered structure of indium tin oxide (ITO), indium tin oxide containing silicon oxide (ITSO), indium oxide containing zinc oxide at 2 to 20 wt % (IZO), gold (Au), platinum (Pt), nickel (Ni), tungsten (W), chromium (Cr), molybdenum (Mo), iron (Fe), cobalt (Co), copper (Cu), palladium (Pd), or the like.

The other of the first electrode 904 and the second electrode 908, which is used as the cathode, is preferably formed using a substance with a low work function. Specifically, the electrode used as the cathode can have a single-layer structure or a layered structure of aluminum (Al), indium (In), an alkali metal such as lithium (Li) or cesium (Cs), an alkaline-earth metal such as magnesium (Mg) or calcium (Ca), or a rare-earth metal such as erbium (Er) or ytterbium (Yb). In addition, an alloy such as aluminum-lithium alloy (AlLi) or magnesium-silver alloy (MgAg) can also be used for the electrode.

The first electrode 904 and the second electrode 908 can be formed by a deposition method such as a sputtering method or an evaporation method by using a shadow mask at the time of film formation.

In this embodiment, the first electrode 904 can be formed using ITO to function as the anode, and the second electrode 908 can be formed using aluminum to function as the cathode.

The light emitted from the light-emitting element 932 is extracted through one or both of the first electrode 904 and the second electrode 908. Accordingly, one or both of the first electrode 904 and the second electrode 908 is/are formed as a light-transmitting electrode. When only the first electrode 904 is a light-transmitting electrode, light is extracted from the substrate 901 side through the first electrode 904. When only the second electrode 908 is a light-transmitting electrode, light is extracted from the insulating film 910 side through the second electrode 908. When both the first electrode 904 and the second electrode 908 are light-transmitting electrodes, light is extracted from both the substrate 901 side and the insulating film 910 side through the first electrode 904 and the second electrode 908.

The organic EL layer 906 includes at least a layer containing a light-emitting substance, and can have a single-layer structure or a layered structure in which a plurality of films are stacked.

For example, when voltage is applied to the light-emitting element 932 using the first electrode 904 as the anode and the second electrode 908 as the cathode, holes injected from the first electrode 904 side and electrons injected from the second electrode 908 side are transported. Then, the light-emitting element 932 functions in such a manner that, by recombination of electrodes and holes in the organic EL layer 906, the light-emitting substance is excited and the light-emitting substance in an excited state emits light when returning to a ground state. In the round-shaped light source portion 930 shown in this embodiment, such a light-emitting element 932 (an electroluminescent element) can be used.

The insulating film 910 protects the light-emitting element 932 and functions as a sealing film for preventing intrusion of oxygen and moisture. The insulating film 910 can have a single-layer structure or a layered structure of a film containing an inorganic material, such as a silicon oxide film, a silicon nitride film, a silicon oxynitride film, a silicon nitride oxide film, an aluminum oxide film, an aluminum nitride film, a magnesium oxide film, an yttrium oxide film, a hafnium oxide film, a tantalum oxide film, a zinc sulfide film, or a zinc sulfide film containing silicon oxide. Alternatively, a thin film containing carbon as its main component (e.g., a DLC film or a CN film) may be used.

Alternatively, for the insulating film 910, a photosensitive or nonphotosensitive organic material such as polyimide, acrylic, polyamide, resist, or benzocyclobutene or a heat resistant organic resin such as siloxane may be employed. Further, an inorganic material and an organic material may be stacked to form the insulating film 910.

When light emitted from the light-emitting element 932 is extracted to the insulating film 910 side, the insulating film 910 is formed using a material that transmits visible light. Examples of the material that transmits visible light are $CaF_2$, $MgF_2$, and $BaF_2$. Since $CaF_2$, $MgF_2$, and $BaF_2$ can be deposited by an evaporation method, damage to the light-emitting element 932 at the time of deposition can be reduced.

An opening portion in the insulating film 910 can be formed using a shadow mask.

The first connection portion 912 and the second connection portion 914 function as terminals for electrical connection with an external wiring or the like. In other words, power is supplied from the outside through the first connection portion 912 and the second connection portion 914 to the first electrode 904 and the second electrode 908, whereby the light-emitting element 932 emits light.

FIG. 9 illustrates the case where the first connection portion 912 formed from the first electrode 904 and the second connection portion 914 formed from the second electrode 908 are provided to face each other; however, this embodiment is not limited to this structure. Another structure can be employed as long as the first connection portion 912 and the second connection portion 914 are provided in the opening portion 915 in the insulating film 910.

In addition, a plurality of first connection portions 912 and a plurality of second connection portions 914 may be provided. For example, two first connection portions and two second connection portions may be provided.

Note that this embodiment can be implemented in combination with any of the other embodiments as appropriate.

Embodiment 3

In this embodiment, another example of a round-shaped light source portion, which is different from that in Embodiment 2, will be described with reference to FIG. 16 and FIGS. 17A and 17B.

Figure 16:
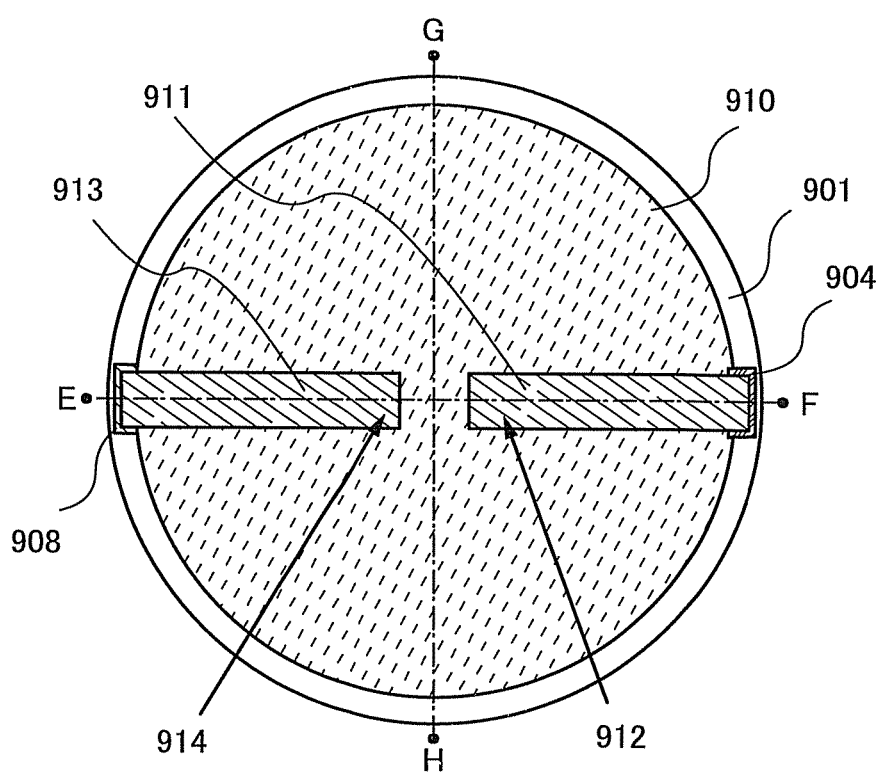
FIG. 16 illustrates the detail of a lighting device.
Figure 17A:
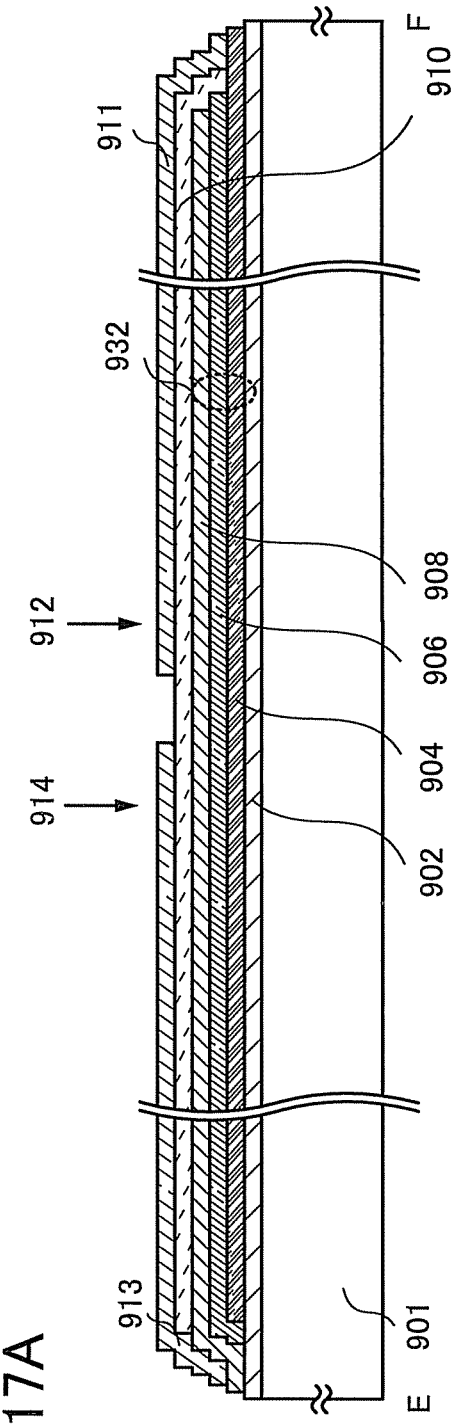
FIGS. 17A and 17B illustrate the detail of a lighting device.
Figure 17B:
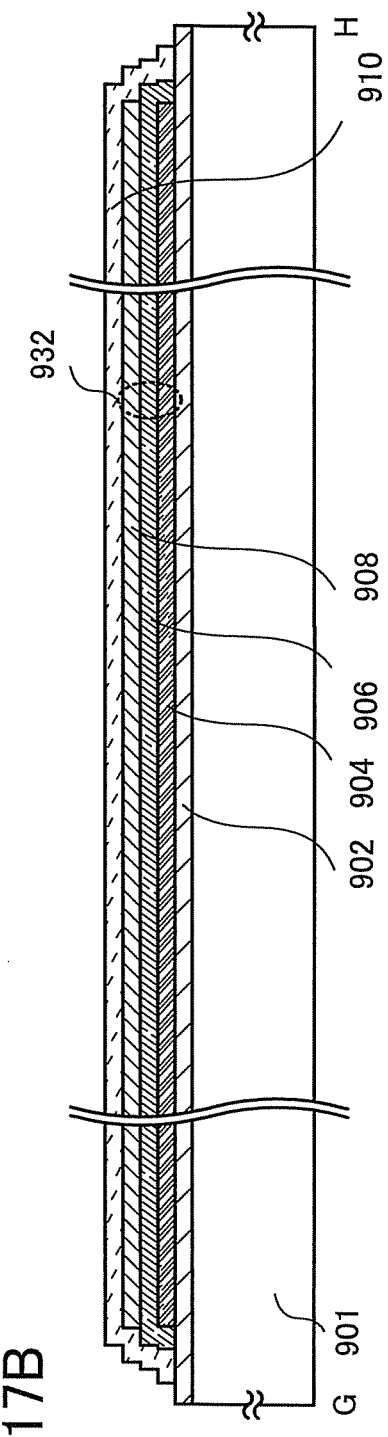

FIG. 16 is a plan view of a round-shaped light source portion. FIG. 17A is a cross-sectional view along E-F in FIG. 16. FIG. 17B is a cross-sectional view along G-H in FIG. 16.

The light-emitting element 932 including the first electrode 904, the organic EL layer 906, and the second electrode 908 is formed over the substrate 901 where the insulating film 902 is provided as a base protective film (a barrier layer). The light-emitting element 932 except parts of the first electrode 904 and the second electrode 908 is covered with the insulating film 910. The insulating film 910 functions as a protective layer (a sealing film) for protecting the organic EL layer 906 in the light-emitting element 932 from contaminants such as moisture from the outside. Note that the substrate 901 has a round shape (a disk shape or a circle shape) and is a component on which a thin film for forming the light-emitting element 932 can be deposited.

Since the substrate 901 is round, the insulating film 902, the first electrode 904, the organic EL layer 906, the second electrode 908, and the insulating film 910, which are stacked over the substrate 901, are influenced by the shape of the substrate 901 and formed in a substantially round shape.

The first electrode 904 and the second electrode 908 are extended to an outer edge portion of the substrate 901 in order to be connected to a first auxiliary wiring 911 and a second auxiliary wiring 913, respectively, which are formed over the insulating film 910. The regions where the first electrode 904 and the second electrode 908 are extended are not covered with the insulating film 910, and the first electrode 904 and the second electrode 908 are exposed. The regions where the first electrode 904 and the second electrode 908 are exposed serve as a connection portion of the first electrode 904 and the first auxiliary wiring 911 and a connection portion of the second electrode 908 and the second auxiliary wiring 913, respectively.

The first auxiliary wiring 911 is formed in contact with the region where the first electrode 904 is extended and exposed. Similarly, the second auxiliary wiring 913 is formed in contact with the region where the second electrode 908 is extended and exposed. The first auxiliary wiring 911 and the second auxiliary wiring 913 function as terminals of the round-shaped light source portion side for connection with terminals of an external power supply, and include a first connection portion 912 (also referred to as a first terminal portion of the round-shaped light source portion) and a second connection portion 914 (also referred to as a second terminal portion of the round-shaped light source portion), respectively, which are connected to the terminals of the external power supply. By the first auxiliary wiring 911 and the second auxiliary wiring 913, the first connection portion 912, which is a connection portion with the first electrode 904, and the second connection portion 914, which is a connection portion with the second electrode 908, can be provided at the center of the circular substrate on the same side as the light-emitting element 932. Note that in this specification, "center" of the substrate or the round-shaped light source portion refers to a region including the center and a portion around the center.

In an outer edge portion E of the substrate 901, the first electrode 904 is formed over the insulating film 902; the organic EL layer 906 is stacked over the first electrode 904 so as to cover an edge portion of the first electrode 904; and the second electrode 908 is formed over the organic EL layer 906 so as to cover an edge portion of the organic EL layer 906 and be extended to the outer edge portion E side of the substrate 901. In the region where the second electrode 908 is extended, the insulating film 910 stacked over the second electrode 908 is not formed, so that the second electrode 908 is exposed. The second auxiliary wiring 913 is formed in contact with the exposed second electrode 908 and over the insulating film 910 up to the center of the substrate 901. Accordingly, by the second auxiliary wiring 913 electrically connected to the second electrode 908, the second connection portion 914 with the external power supply can be formed at the center of the substrate 901.

In an outer edge portion F of the substrate 901, the first electrode 904 is formed over the insulating film 902 so as to be extended to the outer edge portion F side of the substrate 901. The organic EL layer 906 and the second electrode 908 are stacked over the first electrode 904, and the insulating film 910 is formed over the organic EL layer 906 and the second electrode 908 so as to cover edge portions of the organic EL layer 906 and the second electrode 908. In the outer edge portion F, in the region where the first electrode 904 is extended, the organic EL layer 906, the second electrode 908, and the insulating film 910, which are stacked over the first electrode 904, are not formed, so that the first electrode 904 is exposed. The first auxiliary wiring 911 is formed in contact with the exposed first electrode 904 and over the insulating film 910 up to the center of the substrate 901. Accordingly, by the first auxiliary wiring 911 electrically connected to the first electrode 904, the first connection portion 912 with the external power supply can be formed at the center of the substrate 901.

In outer edge portions G and H of the substrate 901, the first electrode 904 is formed over the insulating film 902; the organic EL layer 906 is formed over the first electrode 904 so as to cover the first electrode 904; and the second electrode 908 is formed over the organic EL layer 906. The insulating film 910 is formed over the first electrode 904, the organic EL layer 906, and the second electrode 908 so as to cover edge portions of the organic EL layer 906 and the second electrode 908.

In such a manner, in the round-shaped light source portion, the organic EL layer 906 is formed between the first electrode 904 and the second electrode 908 so that the first electrode 904 and the second electrode 908 are not in contact with each other. Moreover, the edge portions of the organic EL layer 906 are covered with the insulating film 910 or the second electrode 908.

Thus, stable light emission can be obtained from the light-emitting element 932 without short circuit due to contact between the first electrode 904 and the second electrode 908 in the light-emitting element 932. Moreover, degradation of the EL layer because of moisture or the like can be prevented, so that the reliability of the round-shaped light source portion can be increased.

In the round-shaped light source portion in this embodiment, light from the organic EL layer 906 is transmitted through the first electrode 904, the insulating film 902, and the substrate 901 to be extracted. Accordingly, the first electrode 904, the insulating film 902, and the substrate 901 should have a light-transmitting property so that light from the EL layer is transmitted therethrough. Note that in this specification, the term "light-transmitting" refers to a property with which light in a wavelength region of at least visible light is transmitted.

On the other hand, the second electrode 908, the insulating film 910, the first auxiliary wiring 911, and the second auxiliary wiring 913 do not necessarily have a light-transmitting property. When the second electrode 908 has reflectivity, the efficiency of extracting light from the organic EL layer 906 to the substrate 901 side can be increased.

For the first auxiliary wiring 911 and the second auxiliary wiring 913, a conductive material is used. For example, the first auxiliary wiring 911 and the second auxiliary wiring 913 can have a single-layer structure or a layered structure of a material such as aluminum (Al), titanium (Ti), tantalum (Ta), tungsten (W), molybdenum (Mo), chromium (Cr), neodymium (Nd), scandium (Sc), nickel (Ni), or copper (Cu); or an alloy material including any of these materials as its main component. Moreover, the first auxiliary wiring 911 and the second auxiliary wiring 913 can be formed using a conductive material such as indium oxide containing tungsten oxide, indium zinc oxide containing tungsten oxide, indium oxide containing titanium oxide, indium tin oxide containing titanium oxide, indium tin oxide, indium zinc oxide, or indium tin oxide to which silicon oxide is added.

The lighting device in this embodiment can be manufactured through a simple manufacturing process, so that the lighting devices can be mass-produced. Moreover, since the lighting device in this embodiment has a structure in which elements are not likely to deteriorate, the long-life lighting device can be provided. Furthermore, reduction in thickness and weight of the lighting device in this embodiment is realized and the lighting device can be easily electrically connected to an external power supply, whereby the lighting device can be used for various applications.

Note that this embodiment can be implemented in combination with any of the other embodiments as appropriate.

Embodiment 4

In this embodiment, an example of an element structure of the light-emitting element 932 provided in the round-shaped light source portion shown in the above embodiments will be described with reference to FIGS. 11A and 11B.

Figure 11A:
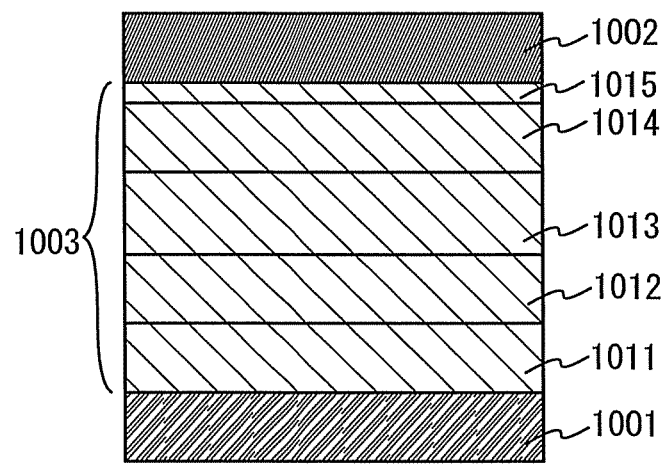
FIGS. 11A and 11B illustrate the detail of a lighting device.

In the element structure illustrated in FIG. 11A, an organic EL layer 1003 including a light-emitting region is sandwiched between a pair of electrodes (an anode 1001 and a cathode 1002). Note that in FIGS. 11A and 11B, each of the anode 1001 and the cathode 1002 corresponds to the first electrode 904 or the second electrode 908 which is described in the above embodiments.

The organic EL layer 1003 includes at least a light-emitting layer 1013, and may have a layered structure including a functional layer other than the light-emitting layer 1013. As the functional layer other than the light-emitting layer 1013, a layer containing a substance having a high hole-injecting property, a substance having a high hole-transporting property, a substance having a high electron-transporting property, a substance having a high electron-injecting property, a bipolar substance (a substance having high electron-transporting and hole-transporting properties), or the like can be used. Specifically, functional layers such as a hole-injecting layer 1011, a hole-transporting layer 1012, a light-emitting layer 1013, an electron-transporting layer 1014, and an electron-injecting layer 1015 can be used in combination as appropriate.

Next, materials used for the above-described light-emitting element are specifically described.

The anode 1001 is preferably formed using a metal, an alloy, an electrically conductive compound, a mixture of these materials, or the like which has a high work function (specifically, a work function of 4.0 eV or higher is preferable). Specific examples are indium tin oxide (ITO), indium tin oxide containing silicon or silicon oxide, indium zinc oxide (IZO), and indium oxide containing tungsten oxide and zinc oxide.

Such a conductive metal oxide film is usually fowled by sputtering; alternatively, a sol-gel method or the like may be used. For example, a film of indium zinc oxide (IZO) can be formed by a sputtering method using a target in which 1 to 20 wt % of zinc oxide is added to indium oxide. A film of indium oxide containing tungsten oxide and zinc oxide can be formed by a sputtering method using a target in which tungsten oxide and zinc oxide are added to indium oxide at 0.5 wt % to 5 wt % and 0.1 wt % to 1 wt %, respectively Moreover, the following material can be used for the anode 1001: gold (Au), platinum (Pt), nickel (Ni), tungsten (W), chromium (Cr), molybdenum (Mo), iron (Fe), cobalt (Co), copper (Cu), palladium (Pd), titanium (Ti), nitride of a metal material (e.g., titanium nitride), molybdenum oxide, vanadium oxide, ruthenium oxide, tungsten oxide, manganese oxide, titanium oxide, and the like.

The cathode 1002 can be formed using a metal, an alloy, an electrically conductive compound, a mixture of these materials, or the like which has a low work function (specifically, a work function of 3.8 eV or less is preferable). Specific examples of such a cathode material are elements belonging to Group 1 or Group 2 of the periodic table, that is, an alkali metal such as lithium (Li) or cesium (Cs) or an alkaline earth metal such as magnesium (Mg), calcium (Ca), or strontium (Sr); an alloy containing any of these elements (e.g., MgAg or AlLi); a rare earth metal such as europium (Eu) or ytterbium (Yb); and an alloy containing such a rare earth metal. Note that a film of an alkali metal, an alkaline earth metal, or an alloy thereof can be formed by a vacuum evaporation method. Further, a film of an alloy containing an alkali metal or an alkaline earth metal can be formed by a sputtering method. Furthermore, a silver paste or the like can be deposited by an ink-jet method or the like.

Alternatively, the cathode 1002 can be formed using a stack of a film of a metal such as aluminum and a thin film of an alkali metal compound, an alkaline earth metal compound, or a rare earth metal compound (e.g., lithium fluoride (LiF), lithium oxide (LiOx), cesium fluoride (CsF), calcium fluoride ($CaF_2$), or erbium fluoride ($ErF_3$)).

Note that in the light-emitting element described in this embodiment, at least one of the anode 1001 and the cathode 1002 has a light-transmitting property.

Next, specific examples of materials used for layers included in the organic EL layer 1003 are described below.

The hole-injecting layer 1011 is a layer that contains a substance having a high hole-injecting property. As the substance having a high hole-injecting property, molybdenum oxide, vanadium oxide, ruthenium oxide, tungsten oxide, or manganese oxide can be used, for example. Alternatively, the hole-injecting layer 1011 can be formed using a phthalocyanine-based compound such as phthalocyanine ($H_2Pc$) or copper phthalocyanine (CuPc); an aromatic amine compound such as 4,4'-bis[N-(4-diphenylaminophenyl)-N-phenylamino]biphenyl (DPAB) or N,N'-bis[4-[bis(3-methylphenyl)amino]phenyl]-N,N'-diphenyl-[1,1'-biphenyl]-4,4'-diamine (DNTPD); a high molecule compound such as poly(3,4-ethylenedioxythiophene)/poly(styrenesulfonic acid) (PEDOT/PSS), or the like. Further, the hole-injecting layer 1011 can be formed using a tris(p-enamine-substituted-aminophenyl)amine compound, a 2,7-diamino-9-fluorenylidene compound, a tri(p-N-enamine-substituted-aminophenyl) benzene compound, a pyrene compound having one or two ethenyl groups having at least one aryl group, N,N'-di(biphenyl-4-yl)-N,N'-diphenylbiphenyl-4,4'-diamine, N,N,N',N'-tetra(biphenyl-4-yl)biphenyl-4,4'-diamine, N,N,N',N'-tetra(biphenyl-4-yl)-3,3'-diethylbiphenyl-4,4'-diamine, 2,2'-(methylenedi-4,1-phenylene)bis[4,5-bis(4-methoxyphenyl)-2H-1,2,3-triazole], 2,2'-(biphenyl-4,4'-diyl)bis(4,5-diphenyl-2H-1,2,3-triazole), 2,2'-(3,3'-dimethylbipheny-4,4'-diyl)bis(4,5-diphenyl-2H-1,2,3-triazole), bis[4-(4,5-diphenyl-2H-1,2,3-triazol-2-yl)phenyl](methyl)amine, or the like.

Alternatively, the hole-injecting layer 1011 can be formed using a composite material with a hole-injecting property, which is obtained by combining an organic compound and an inorganic compound (preferably an inorganic compound having an electron-accepting property with respect to the organic compound). In the composite material with a hole-injecting property, electrons are transported between the organic compound and the inorganic compound and the carrier density is increased; thus, the composite material has excellent hole-injecting and hole-transporting properties.

Further, when the composite material with a hole-injecting property is used for the hole-injecting layer 1011, the hole-injecting layer 1011 can form an ohmic contact with the anode 1001; therefore, a material of the anode 1001 can be selected regardless of the work function.

As the inorganic compound used for the composite material with a hole-injecting property, oxide of a transition metal is preferably used. Moreover, oxide of metals that belong to Group 4 to Group 8 of the periodic table can be used. Specifically, vanadium oxide, niobium oxide, tantalum oxide, chromium oxide, molybdenum oxide, tungsten oxide, manganese oxide, and rhenium oxide are preferably used because their electron-accepting properties are high. In particular, molybdenum oxide is preferably used because it is stable in the air, has a low hygroscopic property, and is easily treated.

As an organic compound used for the composite material with a hole-injecting property, a variety of compounds such as an aromatic amine compound, a carbazole derivative, an aromatic hydrocarbon, or a high molecular compound (oligomer, dendrimer, polymer, or the like) can be used. The organic compound used for the composite material with a hole-injecting property is preferably an organic compound having a high hole-transporting property. Specifically, a substance having a hole mobility of $10^{-6}$ cm$^2$/Vs or higher is preferably used. Note that any other substance may alternatively be used as long as the hole-transporting property thereof is higher than the electron-transporting property thereof. Organic compounds which can be used for the composite material with a hole-injecting property are specifically shown below.

Examples of aromatic amine compound are N,N'-di(p-tolyl)-N,N'-diphenyl-p-phenylenediamine (DTDPPA), 4,4'-bis[N-(4-diphenylaminophenyl)-N-phenylamino]biphenyl (DPAB), N,N'-bis{4-[bis(3-methylphenyl)amino]phenyl}-N,N'-diphenyl-1',1'-biphenyl]-4,4'-diamine (DNTPD), and 1,3,5-tris[N-(4-diphenylaminophenyl)-N-phenylamino]benzene (DPA3B).

Specific examples of carbazole derivatives which can be used for the composite material with a hole-injecting property are 3-[N-(9-phenylcarbazol-3-yl)-N-phenylamino]-9-phenylcarbazole (PCzPCA1), 3,6-bis[N-(9-phenylcarbazol-3-yl)-N-phenylamino]-9-phenylcarbazole (PCzPCA2), and 3-[N-(1-naphtyl)-N-(9-phenylcarbazol-3-yl)amino]-9-phenylcarbazole (PCzPCN1).

Moreover, 4,4'-di(N-carbazolyl)biphenyl (CBP); 1,3,5-tris[4-(N-carbazolyl)phenyl]benzene (TCPB); 9-[4-(N-carbazolyl)]phenyl-10-phenylanthracene (CzPA); 1,4-bis[4-(N-carbazolyl)phenyl]-2,3,5,6-tetraphenylbenzene; or the like can also be used.

Examples of aromatic hydrocarbon which can be used for the composite material with a hole-injecting property are 2-tert-butyl-9,10-di(2-naphthyl)anthracene (t-BuDNA); 2-tert-butyl-9,10-di(1-naphthyl)anthracene; 9,10-bis(3,5-diphenylphenyl)anthracene (DPPA); 2-tert-butyl-9,10-bis(4-phenylphenyl)anthracene (t-BuDBA); 9,10-di(2-naphthyl)anthracene (DNA); 9,10-diphenylanthracene (DPAnth); 2-tert-butylanthracene (t-BuAnth); 9,10-bis(4-methyl-1-naphthyl)anthracene (DMNA); 2-tert-butyl-9,10-bis[2-(1-naphthyl)phenyl]anthracene; 9,10-bis[2-(1-naphthyl)phenyl]anthracene; 2,3,6,7-tetramethyl-9,10-di(1-naphthyl)anthracene; 2,3,6,7-tetramethyl-9,10-di(2-naphthyl)anthracene; 9,9'-bianthryl; 10,10'-diphenyl-9,9'-bianthryl; 10,10'-bis(2-phenylphenyl)-9,9'-bianthryl; 10,10'-bis[(2,3,4,5,6-pentaphenyl)phenyl]-9,9'-bianthryl; anthracene; tetracene; rubrene; perylene; and 2,5,8,11-tetra(tert-butyl)perylene. Further, pentacene, coronene, or the like can also be used. In particular, aromatic hydrocarbon which has a hole mobility of $1\times10^{-6}$ cm$^2$/Vs or higher and has 14 to 42 carbon atoms is preferably used.

Note that the aromatic hydrocarbon which can be used for the composite material with a hole-injecting property may have a vinyl skeleton. Examples of the aromatic hydrocarbon having a vinyl group are 4,4'-bis(2,2-diphenylvinyl)biphenyl (DPVBi) and 9,10-bis[4-(2,2-diphenylvinyl)phenyl]anthracene (DPVPA).

Moreover, a high molecular compound such as poly(N-vinylcarbazole) (PVK) or poly(4-vinyltriphenylamine) (PVTPA) can also be used.

The hole-transporting layer 1012 is a layer that contains a substance having a high hole-transporting property. As the substance with a high hole-transporting property, an aromatic amine compound (i.e., a compound having a benzene ring-nitrogen bond) is preferably used, for example. Examples of the material which are widely used are 4,4'-bis[N-(3-methylphenyl)-N-phenylamino]biphenyl; a derivative thereof such as 4,4'-bis[N-(1-napthyl)-N-phenylamino]biphenyl (hereinafter referred to as NPB); and a starburst aromatic amine compound such as 4,4',4''-tris(N,N-diphenyl-amino)triphenylamine and 4,4',4''-tris[N-(3-methylphenyl)-N-phenylamino]triphenylamine. Most of the substances mentioned here have a hole mobility of $10^{-6}$ cm$^2$/Vs or higher. Note that any other substance may alternatively be used as long as the hole-transporting property thereof is higher than the electron-transporting property thereof. Note that the hole-transporting layer 1012 is not limited to a single layer, and may be a mixed layer of the above-described substances or a stack including two or more layers each containing the above-described substance.

Alternatively, a hole-transporting material may be added to a macromolecular compound that is electrically inactive, such as PMMA.

Moreover, a macromolecular compound such as poly(N-vinylcarbazole) (PVK), poly(4-vinyltriphenylamine) (PVTPA), poly[N-(4-{N'[4-(4-diphenylamino)phenyl]phenyl-N-phenylamino}phenyl)methacrylamide] (PTPDMA), or poly[N,N'-bis(4-butylphenyl)-N,N'-bis(phenyl)benzidine (poly-TPD) may be used. Further, the material with a hole-transporting property may be added to the above-described macromolecular compound as appropriate. Further, the hole-transporting layer 1012 can be formed using a tris(p-enamine-substituted-aminophenyl)amine compound, a 2,7-diamino-9-fluorenylidene compound, a tri(p-N-enamine-substituted-aminophenyl) benzene compound, a pyrene compound having one or two ethenyl groups having at least one aryl group, N,N'-di(biphenyl-4-yl)-N,N'-diphenylbiphenyl-4,4'-diamine, N,N,N',N'-tetra(biphenyl-4-yl)biphenyl-4,4'-diamine, N,N,N',N'-tetra(biphenyl-4-yl)-3,3'-diethylbiphenyl-4,4'-diamine, 2,2'-(methylenedi-4,1-phenylene)bis[4,5-bis(4-methoxyphenyl)-2H-1,2,3-triazole], 2,2'-(biphenyl-4,4'-diyl)bis(4,5-diphenyl-2H-1,2,3-triazole), 2,2'-(3,3'-dimethylbipheny-4,4'-diyl)bis(4,5-diphenyl-2H-1,2,3-triazole), bis[4-(4,5-diphenyl-2H-1,2,3-triazol-2-yl)phenyl](methyl)amine, or the like.

The light-emitting layer 1013 is a layer containing a light-emitting substance, and a variety of materials can be used for the light-emitting layer 1013. As the light-emitting substance, a fluorescent compound which emits fluorescence or a phosphorescent compound which emits phosphorescence can be used, for example. Organic compound materials which can be used for the light-emitting layer are described below. Note that a material which can be applied to the light-emitting element is not limited to the materials described below.

Blue to blue-green light emission can be obtained, for example, by using perylene, 2,5,8,11-tetra-t-butylperylene (1BP), 9,10-diphenylanthracene, or the like as a guest material and dispersing the guest material in a suitable host material. Alternatively, blue to blue-green light emission can be obtained from a styrylarylene derivative such as 4,4'-bis(2,2-diphenylvinyl)biphenyl (DPVBi), or an anthracene derivative such as 9,10-di-2-naphthylanthracene (DNA) or 9,10-bis(2-naphthyl)-2-t-butylanthracene (t-BuDNA). Further, a polymer such as poly(9,9-dioctylfluorene) may be used. In addition, as a guest material for blue light emission, a styrylamine derivative is preferably used. Examples of the styrylamine derivative are N,N'-bis[4-(9H-carbazol-9-yl)phenyl]-N,N'-diphenylstilbene-4,4'-diamine (YGA2S) and N,N''-diphenyl-N,N'-bis(9-phenyl-9H-carbazol-3-yl)stilbene-4,4'-diamine (PCA2S). In particular, YGA2S is preferable because it has a peak at around 450 nm. As a host material, an anthracene derivative is preferably used; 9,10-bis(2-naphthyl)-2-t-butylanthracene (t-BuDNA) and 9-[4-(10-phenyl-9-anthryl)phenyl]-9H-carbazole (CzPA) are suitable. In particular, CzPA is preferable because it is electrochemically stable.

Blue-green to green light emission can be obtained, for example, by using a coumarin dye such as coumarin 30 or coumarin 6; bis[2-(2,4-difluorophenyl)pyridinato]picolinatoiridium (FIrpic); bis(2-phenylpyridinato)acetylacetonatoiridium (Ir(ppy)$_2$(acac)); or the like as a guest material and dispersing the guest material in a suitable host material. Further, blue-green to green light emission can be obtained by dispersing perylene or TBP, which are mentioned above, in a suitable host material at a high concentration of 5 wt % or more. Furthermore, blue-green to green light emission can be obtained from a metal complex such as BAlq, Zn(BTZ)$_2$, or bis(2-methyl-8-quinolinolato)chlorogallium (Ga(mq)$_2$Cl). A polymer such as poly(p-phenylenevinylene) may be used. In addition, an anthracene derivative is preferably used as a guest material of a light-emitting layer for blue-green to green light emission because high light emission efficiency can be obtained. For example, when 9,10-bis{4[N-(4-diphenylamino)phenyl-N-phenyl]aminophenyl}-2-tert-butylanthracene (DPABPA) is used, highly efficient blue-green light emission can be obtained. Further, an anthracene derivative in which an amino group has been substituted into the 2-position is preferably used because highly efficient green light emission can be obtained. In particular, N-(9,10-diphenyl-2-anthryl)-N,9-diphenyl-9H-carbazol-3-amine (2PCAPA) is suitable because of its long life. As a host material for these materials, an anthracene derivative is preferably used. CzPA, which is mentioned above, is preferable since it is electrochemically stable. Furthermore, when a light-emitting element that has two peaks in the blue to green wavelength range is manufactured by combining green light emission and blue light emission, it is preferable to use an anthracene derivative having an electron-transporting property, such as CzPA, as a host material for a light-emitting layer for blue and use an aromatic amine compound having a hole-transporting property, such as NPB, as a host material for a light-emitting layer for green, because light emission can be obtained at an interface between the light-emitting layer for blue and the light-emitting layer for green. That is, in such a case, an aromatic amine compound such as NPB is preferably used as a host material of the light-emitting material for green, such as 2PCAPA.

Yellow to orange light emission can be obtained, for example, by using rubrene, 4-(dicyanomethylene)-2-[p-(dimethylamino)styryl]-6-methyl-4H-pyran (DCM1), 4-(dicyanomethylene)-2-methyl-6-(9-julolidyl)ethenyl-4H-pyran (DCM2), bis[2-(2-thienyl)pyridinato]acetylacetonatoiridium (Ir(thp)$_2$(acac)), bis(2-phenylquinolinato)acetylacetonatoiridium (Ir(pq)$_2$(acac)), or the like as a guest material and dispersing the guest material in a suitable host material. In particular, a tetracene derivative such as rubrene is preferably used as a guest material because it is highly efficient and chemically stable. As a host material in that case, an aromatic amine compound such as NPB is preferable. Alternatively, a metal complex such as bis(8-quinolinolato)zinc (Znq$_2$) or bis[2-cinnamoyl-8-quinolinolato]zinc (Znsq$_2$) can be used as the host material. Further alternatively, a polymer such as poly(2,5-dialkoxy-1,4-phenylenevinylene) may be used.

Orange to red light emission can be obtained by, for example, using 4-(dicyanomethylene)-2,6-bis[p-(dimethylamino)styryl]-4H-pyran (BisDCM), 4-(dicyanomethylene)-2,6-bis[2-(julolidin-9-yl)ethenyl]-4H-pyran (BisDCJ), 4-(dicyanomethylene)-2-[p-(dimethylamino)styryl]-6-methyl-4H-pyran (DCM1), 4-(dicyanomethylene)-2-methyl-6-(9-julolidyl)ethenyl-4H-pyran (DCM2), bis[2-(2-thienyl)pyridinato]acetylacetonatoiridium (Ir(thp)$_2$(acac)), or the like as a guest material and dispersing the guest material in a suitable host material. Orange to red light emission can also be obtained by using a metal complex such as bis(8-quinolinolato)zinc (Znq$_2$) or bis[2-cinnamoyl-8-quinolinolato]zinc (Znsq$_2$). Further, a polymer such as poly(3-alkylthiophene) may be used. As a guest material which exhibits red light emission, a 4H-pyran derivative such as 4-(dicyanomethylene)-2,6-bis[p-(dimethylamino)styryl]-4H-pyran (Bis-DCM), 4-(dicyanomethylene)-2,6-bis[2-(julolidin-9-yl)ethenyl]-4H-pyran (BisDCJ), 4-(dicyanomethylene)-24p-(dimethylamino)styryl]-6-methyl-4H-pyran (DCM1), 4-(dicyanomethylene)-2-methyl-6-(9-julolidyl)ethenyl-4H-pyran (DCM2), {2-isopropyl-6-[2-(2,3,6,7-tetrahydro-1,1,7,7-tetramethyl-1H,5H-benzo[ij]quinolizin-9-yl)ethenyl]-4H-pyran-4-ylidene}propanedinitrile (DCJTI), or {2,6-bis[2-(2,3,6,7-tetrahydro-8-methoxy-1,1,7,7-tetramethyl-1H,5H-benzo[i]]quinolizin-9-yl)ethenyl]-4H-pyran-4-ylidene}propanedinitrile (BisDCJTM) is preferably used because of its high efficiency. In particular, DCJTI and Bis-DCJTM are preferable since they have a light emission peak at around 620 nm.

Note that the light-emitting layer 1013 may have a structure in which any of the above light-transmitting substances (guest materials) is dispersed into another substance (a host material). As a substance into which the substance having a high light-emitting property is dispersed, various kinds of materials can be used. It is preferable to use a substance whose lowest unoccupied molecular orbital (LUMO) level is higher than that of a substance having a high light-emitting property and whose highest occupied molecular orbital (HOMO) level is lower than that of the substance having a high light-emitting property.

Specifically, the following substance can be used as the substance into which the substance having a light-emitting property is dispersed: a metal complex such as tris(8-quinolinolato)aluminum(III) (Alq), tris(4-methyl-8-quinolinolato)aluminum(III) (Almq$_3$), bis(10-hydroxybenzo[h]quinolinato)beryllium(II) (BeBq$_2$), bis(2-methyl-8-quinolinolato)(4-phenylphenolato)aluminum(III) (BAlq), bis(8-quinolinolato)zinc(II) (Znq), bis[2-(2-benzoxazolyl)phenolato]zinc(II) (ZnPBO), or bis[2-(2-benzothiazolyl)phenolato]zinc(II) (ZnBTZ); a heterocyclic compound such as 2-(4-biphenylyl)-5-(4-tert-butylphenyl)-1,3,4-oxadiazole (PBD), 1,3-bis[5-(p-tert-butylphenyl)-1,3,4-oxadiazol-2-yl]benzene (OXD-7), 3-(4-biphenylyl)-4-phenyl-5-(4-tert-butylphenyl)-1,2,4-triazole (TAZ), 2,2',2"-(1,3,5-benzenetriyl)tris(1-phenyl-1H-benzimidazole) (TPBI), bathophenanthroline (BPhen), or bathocuproine (BCP); a condensed aromatic compound such as 9-[4-(10-phenyl-9-anthryl)phenyl]-9H-carbazole (CzPA), 3,6-diphenyl-9-[4-(10-phenyl-9-anthryl)phenyl]-9H-carbazole (DPCzPA), 9,10-bis(3,5-diphenylphenyl)anthracene (DPPA), 9,10-di(2-naphthyl)anthracene (DNA), 2-tert-butyl-9,10-di(2-naphthyl)anthracene (t-BuDNA), 9,9'-bianthryl (BANT), 9,9'-(stilbene-3,3'-diyl)diphenanthrene (DPNS), 9,9'-(stilbene-4,4'-diyl)diphenanthrene (DPNS2), 3,3',3"-(benzene-1,3,5-triyl)tripyrene (TPB3), 9,10-diphenylanthracene (DPAnth), or 6,12-dimethoxy-5,11-diphenylchrysene; or an aromatic amine compound such as N,N-diphenyl-9-[4-(10-phenyl-9-anthryl)phenyl]-9H-carbazol-3-amine (CzA1PA), 4-(10-phenyl-9-anthryl)triphenylamine (DPhPA), N,9-diphenyl-N-[4-(10-phenyl-9-anthryl)phenyl]-9H-carbazol-3-amine (PCAPA), N,9-diphenyl-N-{4-[4-(10-phenyl-9-anthryl)phenyl]phenyl}-9H-carbazol-3-amine (PCAPBA), N-(9,10-diphenyl-2-anthryl)-N,9-diphenyl-9H-carbazol-3-amine (2PCAPA), NPB (or α-NPD), TPD, DFLDPBi, or BSPB.

Alternatively, a substance into which the substance with a light-emitting property is dispersed, a plurality of kinds of substances can be used. For example, in order to suppress crystallization, a substance that suppresses crystallization, such as rubrene, may be further added. In addition, NPB, Alq, or the like may be further added in order to efficiently transfer energy to the light-transmitting substance.

With the structure in which a light-emitting substance is dispersed into another substance, crystallization of the light-emitting layer 1013 can be suppressed. Further, concentration quenching due to high concentration of the light-transmitting substance can be suppressed.

The electron-transporting layer 1014 is a layer that contains a substance with a high electron-transporting property. Examples of the substance with a high electron-transporting property are a metal complex having a quinoline skeleton or a benzoquinoline skeleton, such as tris(8-quinolinolato)aluminum ($Alq_3$), tris(4-methyl-8-quinolinolato)aluminum ($Almq_3$), bis(10-hydroxybenzo[h]-quinolinato)beryllium ($BeBq_2$), and bis(2-methyl-8-quinolinolato)(4-phenylphenolate)aluminum (BAlq). Moreover, a metal complex or the like including an oxazole-based or thiazole-based ligand, such as bis[2-(2-hydroxyphenyl)benzoxazolato]zinc ($Zn(BOX)_2$) or bis[2-(2-hydroxyphenyl)benzothiazolato]zinc ($Zn(BTZ)_2$) can be used. Besides the metal complexes, 2-(4-biphenylyl)-5-(4-tert-butylphenyl)-1,3,4-oxadiazole (PBD), 1,3-bis[5-(p-tert-butylphenyl)-1,3,4-oxadiazole-2-yl]benzene (OXD-7), 3-(4-biphenylyl)-4-phenyl-5-(4-tert-butylphenyl)-1,2,4-triazole (TAZ), bathophenanthroline (BPhen), bathocuproine (BCP), bis[3-(1H-benzimidazol-2-yl)fluoren-2-olato]zinc (II), bis[3-(1H-benzimidazol-2-yl)fluoren-2-olato]beryllium (II), bis[2-(1H-benzimidazol-2-yl)dibenzo[b,d]furan-3-olato](phenolato)aluminum(III), bis[2-(benzoxazol-2-yl)-7,8-methylenedioxydibenzo[b,d]furan-3-olato](2-naphtholato)aluminum(III), or the like can also be used. Most of the substances mentioned here have an electron mobility of $10^{-6}$ $cm^2/Vs$ or higher. Note that any other substance may alternatively be used for the electron-transporting layer 1014 as long as the electron-transporting property thereof is higher than the hole-transporting property thereof. Further, the electron-transporting layer 1014 is not limited to have a single-layer structure and may have a layered structure in which two or more layers each containing any of the above substances are stacked.

The electron-injecting layer 1015 is a layer containing a substance having a high electron-injecting property. Examples of the substance having a high electron-injecting property are an alkali metal, an alkaline earth metal, and a compound thereof such as lithium fluoride (LiF), cesium fluoride (CsF), and calcium fluoride ($CaF_2$). Alternatively, a composite material with an electron-injecting property, which is obtained by combining an organic compound (preferably an organic compound with an electron-transporting property) and an inorganic compound (preferably an alkali metal, an alkaline earth metal, a rare earth metal, or a compound of such metals), can be used. An example of the composite material with an electron-injecting property is Alq containing magnesium (Mg). Such a structure makes it possible to increase the injection efficiency of electrons from the cathode 1002.

Note that when the composite material with an electron-injecting property is used for the electron-injecting layer 1015, a variety of conductive materials such as Al, Ag, ITO, or ITO containing silicon or silicon oxide can be used for the cathode 1002 regardless of the work function of the material.

The above-described layers are stacked in appropriate combination, whereby the organic EL layer 1003 can be formed. Note that the light-emitting layer 1013 may have a layered structure of two or more layers. When the light-emitting layer 1013 has a layered structure of two or more layers and different light-emitting substances are used for light-emitting layers, various colors of light emission can be obtained. In addition, when a plurality of light-emitting substances of different colors are used as the light-emitting substance, light emission having a broad spectrum or white light emission can be obtained. In particular, the light-emitting layer used in a lighting device, for which high luminance is necessary, preferably has a layered structure.

As a method of limning the organic EL layer 1003, any of a variety of methods (e.g., a dry process and a wet process) can be selected as appropriate depending on a material to be used. For example, a vacuum evaporation method, a sputtering method, an ink-jet method, a spin coating method, or the like can be used. Note that a different formation method may be employed for each layer.

Further, the light-emitting element described in this embodiment can be formed by a variety of methods regardless of whether it is a dry process (e.g., a vacuum evaporation method or a sputtering method) or a wet process (e.g., an ink-jet method or a spin coating method).

Figure 11B:
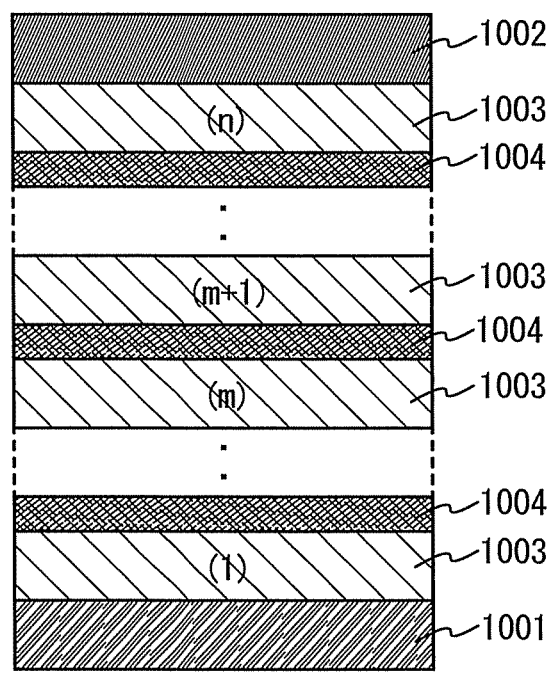

The structure of the light-emitting element described in this embodiment may be a structure in which a plurality of organic EL layers 1003 are stacked between a pair of electrodes as illustrated in FIG. 11B, that is, a stacked element structure. Note that when the organic EL layer 1003 has a layered structure of n (n is a natural number of 2 or more) layers, an intermediate layer 1004 is provided between an m-th (m is a natural number, where $1 \leq m \leq n-1$) organic EL layer and an (m+1)th organic EL layer.

Note that the intermediate layer 1004 has a function of injecting electrons to one organic EL layer 1003 which is formed in contact with the intermediate layer 1004 and placed on the anode 1001 side, and a function of injecting holes to the other organic EL layer 1003 which is placed on the cathode 1002 side, when voltage is applied to the anode 1001 and the cathode 1002.

The intermediate layer 1004 can be formed using the above-described composite material of an organic compound and an inorganic compound (the composite material with a hole-injecting property or the composite material with an electron-injecting property) or formed using materials such as metal oxides in appropriate combination. It is more preferable to use the composite material with a hole-injecting property and another material in combination. Since these materials used for the intermediate layer 1004 are excellent in carrier-injecting property and carrier-transporting property, a light-emitting element that can be driven with low current can be obtained.

In the case where a light-emitting element has a stacked element structure in which two organic EL layers are stacked, when light emitted from the first organic EL layer and light emitted from the second organic EL layer are made to have complementary colors, white light emission can be extracted to the outside. Note that white light emission can also be obtained with a structure in which the first organic EL layer and the second organic EL layer each include a plurality of light-emitting layers that emit light with colors complementary to each other. Examples of complementary colors are blue and yellow, and blue-green and red. A substance which emits light of blue, yellow, blue-green, or red may be selected as appropriate from the above-described light-emitting substances, for example.

The following shows an example of a structure in which white light emission is obtained with the first organic EL layer and the second organic EL layer each including a plurality of light-emitting layers that emit light with colors complementary to each other.

For example, the first organic EL layer includes a first light-emitting layer which exhibits light emission with a spectrum whose peak is in the wavelength range of blue to blue-green, and a second light-emitting layer which exhibits light emission with a spectrum whose peak is in the wavelength range of yellow to orange. The second organic EL layer includes a third light-emitting layer which exhibits light emission with a spectrum whose peak is in the wavelength range of blue-green to green, and a fourth light-emitting layer which exhibits light emission with a spectrum whose peak is in the wavelength range of orange to red.

In this case, light emitted from the first organic EL layer is a combination of light emitted from both the first light-emitting layer and the second light-emitting layer, and thus exhibits a light emission spectrum having peaks both in the wavelength range of blue to blue-green and in the wavelength range of yellow to orange. That is, the first organic EL layer exhibits light emission that has a two-wavelength-type white or color similar to white.

Moreover, light emitted from the second organic EL layer is a combination of light emitted from both the third light-emitting layer and the fourth light-emitting layer, and thus exhibits a light emission spectrum having peaks both in the wavelength range of blue-green to green and in the wavelength range of orange to red. That is, the second organic EL layer exhibits light emission that has a two-wavelength-type white or color similar to white, which is different from the light emission spectrum of the first organic EL layer.

Accordingly, by combining light emitted from the first organic EL layer and light emitted from the second organic EL layer, white light emission which covers the wavelength range of blue to blue-green, the wavelength range of blue-green to green, the wavelength range of yellow to orange, and the wavelength range of orange to red can be obtained.

Note that in the stacked element structure, an intermediate layer is placed between organic EL layers stacked, whereby an element can have long lifetime in a high-luminance region while the current density is kept low. In addition, voltage drops due to resistance of the electrode material can be reduced, whereby uniform light emission in a large area is possible.

Note that this embodiment can be implemented in combination with any of the other embodiments as appropriate.

Embodiment 5

In this embodiment, a connection structure of the round-shaped light source portion 930 described in Embodiment 2 and a base portion 950 will be described with reference to FIGS. 12A and 12B.

The base portion 950 includes a control circuit 952 and a first connection wiring 954, a second connection wiring 956, a first extraction wiring 958, and a second extraction wiring 960 which are electrically connected to the control circuit 952.

The control circuit 952 has a function of lighting the light-emitting element 932 at constant luminance on the basis of power supply voltage supplied from an external power supply. The control circuit 952 has the structure of the control circuit portion described in Embodiment 1. Moreover, the control circuit 952 may be provided with a protective circuit or the like against surges as needed.

The first connection wiring 954 and the second connection wiring 956 function as wirings for electrically connecting the light-emitting element 932 provided in the round-shaped light source portion 930 and the control circuit 952 to each other. Specifically, the first connection wiring 954 is electrically connected to the first connection portion 912 provided over the substrate 901, and the second connection wiring 956 is electrically connected to the second connection portion 914 provided over the substrate 901 (see FIG. 12B).

Figure 12A:
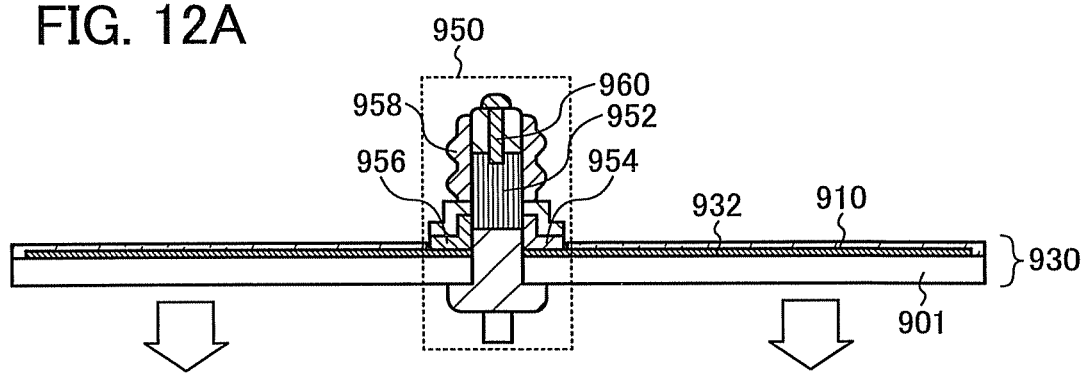
FIGS. 12A and 12B illustrate the detail of a lighting device.
Figure 12B:
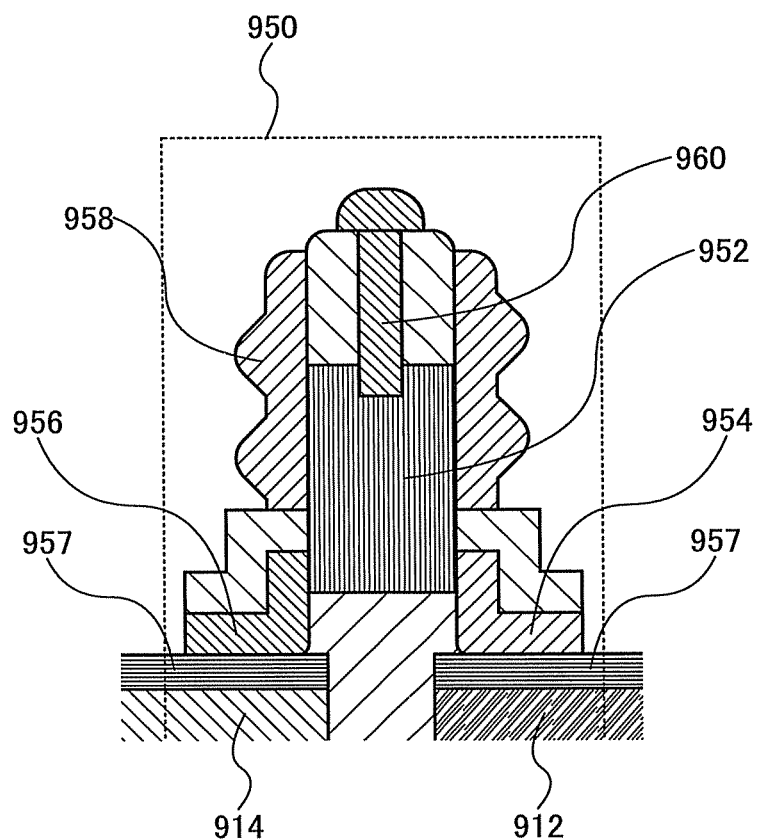

Electrical connection between the first connection wiring 954 and the first connection portion 912 and between the second connection wiring 956 and the second connection portion 914 can be realized using an anisotropic conductive paste 957 as illustrated in FIG. 12B. Note that electrical connection can be realized not only by an anisotropic conductive paste (ACP) but also by pressure bonding using an anisotropic conductive film (ACF) or the like. Alternatively, conductive adhesive such as a silver paste, a copper paste, or a carbon paste; a solder joint; or the like can be used for realizing the connection.

The first extraction wiring 958 and the second extraction wiring 960 are electrically connected to the control circuit 952, and function as wirings for supplying power to the round-shaped light source portion 930 from the outside.

FIG. 12A illustrates the structure in which light is extracted from the side where the substrate 901 is provided (the side opposite to the side where the insulating film 910 is provided) through the substrate 901. In that case, the control circuit 952 in the base portion 950 can be provided above the insulating film 910.

A way of extracting light from the light-emitting element 932 is not limited to the structure illustrated in FIG. 12A. Light may be extracted from the side where the insulating film 910 is provided (the side opposite to the substrate 901). In that case, the control circuit 952 can be provided on the side of a back surface of the substrate 901 (the side opposite to the side where the light-emitting element 932 is provided) and the first connection wiring 954 and the second connection wiring 956 can be electrically connected to the light-emitting element 932 through an opening portion provided in the substrate 901.

In the structure illustrated in FIGS. 12A and 12B, a drying agent is preferably provided over a surface opposite to the surface from which light is extracted (over the insulating film 910 in FIG. 12A). The drying agent can be formed by sputtering or the like. Particularly when the drying agent is provided on the back surface side of the substrate 901, the drying agent can be provided over the entire surface by sputtering.

Note that this embodiment can be implemented in combination with any of the other embodiments as appropriate.

Embodiment 6

In this embodiment, application examples of the lighting device will be described.

Figure 13:
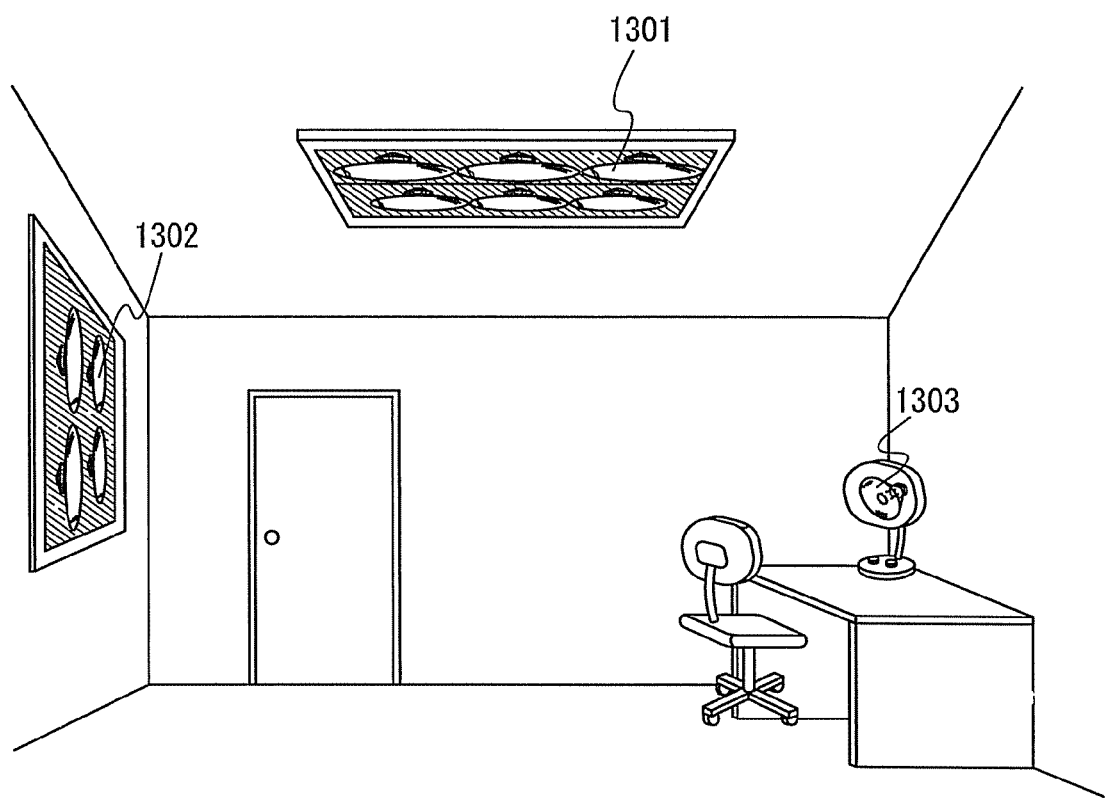
FIG. 13 illustrates an application example of a lighting device.

FIG. 13 illustrates an example where the lighting device, which is one embodiment of the present invention, is used as an indoor lighting device. The lighting device, which is one embodiment of the present invention, can be used not only as a ceiling lighting device 1301 but also as a wall lighting device 1302. Moreover, the lighting device can also be used as a desk lighting device 1303. The lighting device, which is one embodiment of the present invention, is preferably used as an indoor lighting device because of the following reasons, for example. Since the lighting device includes a surface light source, components such as a light reflector can be reduced as compared to the case of using a point light source. Moreover, the amount of heat to be generated is smaller than that of an incandescent lamp.

Figure 14A:
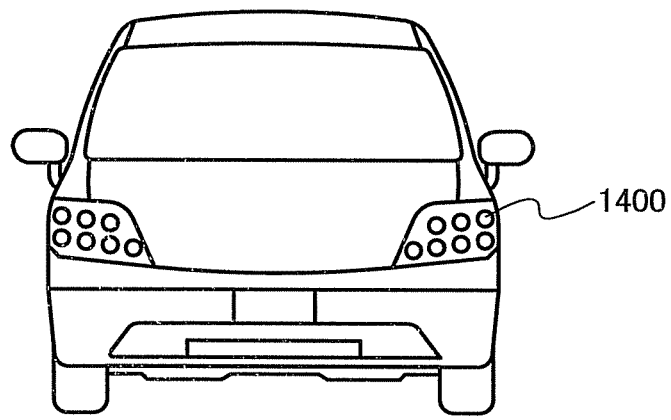
FIGS. 14A to 14C each illustrate an application example of a lighting device.
Figure 14B:
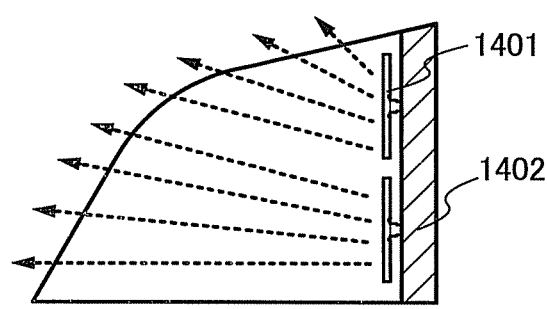
Figure 14C:
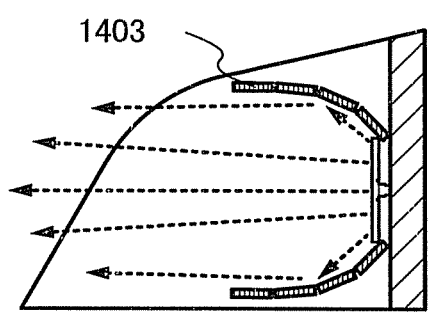

In addition, the lighting device, which is one embodiment of the present invention, can be used as a headlight for a car, a bicycle, and the like. FIGS. 14A to 14C each illustrate an example where the lighting device, which is one embodiment of the present invention, is used as a car headlight. FIG. 14A is an external view of a car for which the lighting device, which is one embodiment of the present invention, is used as a headlight 1400. FIGS. 14B and 14C are cross-sectional views of the headlight 1400 in FIG. 14A. In FIGS. 14B and 14C, a lighting device 1401 connected to a power supply connector 1402 is used as a light source. In FIG. 14B, a plurality of lighting devices 1401 are used, so that light with high luminance can be extracted to the outside. On the other hand, in FIG. 14C, light from the lighting device is focused by a reflector 1403, so that light with directivity and high luminance can be extracted to the outside.

Figure 15A:
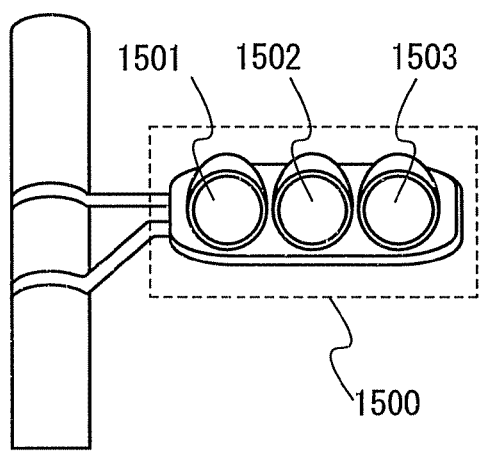
FIGS. 15A to 15E each illustrate an application example of a lighting device.

Next, FIG. 15A shows an example where the lighting device, which is one embodiment of the present invention, is applied to a lighting device in a traffic light, a guide light, or the like.

FIG. 15A illustrates an example of the appearance of a traffic light. A traffic light 1500 includes a blue lighting portion 1501, a yellow lighting portion 1502, and a red lighting portion 1503. The traffic light 1500 includes lighting devices which are one embodiment of the present invention and correspond to three colors of blue, yellow, and red, as lighting devices in the lighting portions.

Figure 15B:
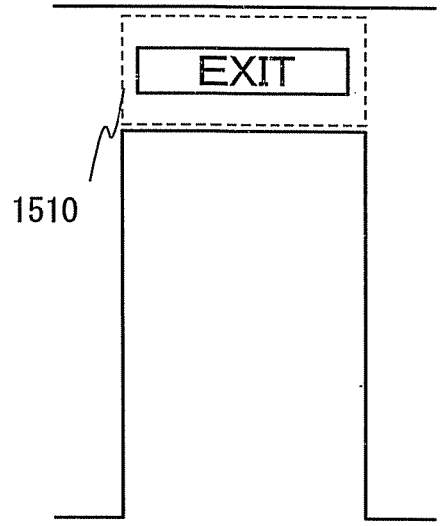

FIG. 15B shows an example where the lighting device, which is one embodiment of the present invention, is applied to an emergency exit light.

FIG. 15B illustrates an example of the appearance of an emergency exit light. An emergency exit light 1510 can be formed using a lighting device and a fluorescent plate provided with a fluorescent portion in combination. Alternatively, the emergency exit light 1510 can be formed by combining a lighting device that emits light with a specific color and a light-shielding plate provided with a transmissive portion having a shape illustrated in the drawing. Since the lighting device, which is one embodiment of the present invention, can emit light with constant luminance, the lighting device is preferably used as an emergency exit light which needs to be lit all the time.

Figure 15C:
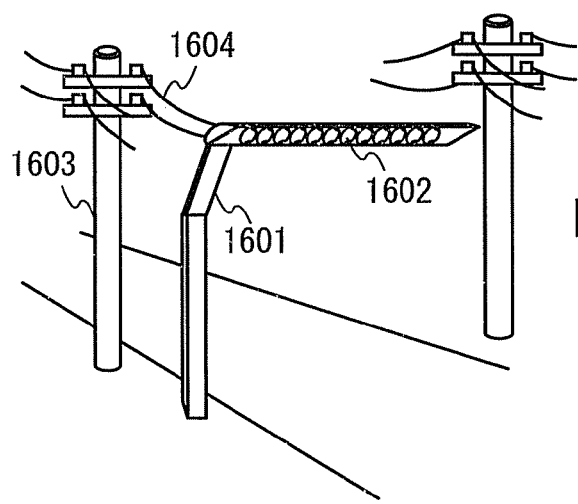

FIG. 15C shows an example where the lighting device, which is one embodiment of the present invention, is applied to an exterior light.

An example of an exterior light is a street light. For example, a street light can include a housing 1601 and a lighting portion 1602 as illustrated in FIG. 15C. A plurality of lighting devices, which are one embodiment of the present invention, can be provided in the lighting portion 1602. As illustrated in FIG. 15C, the street light can be placed along a road, for example, and illuminate the surroundings by the lighting portion 1602; thus, the visibility of the surroundings including the road can be increased.

When power supply voltage is supplied to the street light, the power supply voltage can be supplied through a power transmission line 1604 of a utility pole 1603 as illustrated in FIG. 15C, for example. Note that this embodiment is not limited to this structure. For example, a photoelectric conversion device can be provided in the housing 1601, and voltage obtained by the photoelectric conversion device can be used as the power supply voltage.

Figure 15D:
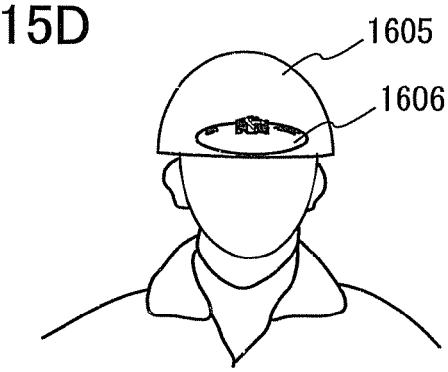
Figure 15E:
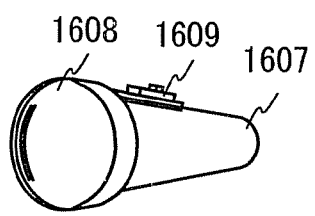

FIGS. 15D and 15E each show an example where the lighting device, which is one embodiment of the present invention, is applied to a portable light. FIG. 15D illustrates a structure of a wearable light. FIG. 15E illustrates a structure of a handheld light.

The wearable light illustrated in FIG. 15D includes a mounting portion 1605 and a lighting portion 1606. The lighting portion 1606 is fixed to the mounting portion 1605. The lighting device, which is one embodiment of the present invention, can be used for the lighting portion 1606. The mounting portion 1605 in the wearable light illustrated in FIG. 15D is mounted on a head, and the lighting portion 1606 can emit light. The visibility of the surroundings can be increased by using a surface light source for the lighting portion 1606. Moreover, since the lighting portion 1606 is lightweight, the load of wearing the wearable light on the head can be reduced.

Note that the structure of the wearable light is not limited to that in FIG. 15D. For example, a ring-shaped flat band or elastic string can be used as the mounting portion 1605, fixed to the lighting portion 1606, and put directly around a head.

The handheld light illustrated in FIG. 15E includes a housing 1607, a lighting portion 1608, and a switch 1609. The lighting device, which is one embodiment of the present invention, can be used for the lighting portion 1608. Accordingly, the thickness and size of the lighting portion 1608 can be reduced, so that the lighting device is likely to be carried.

The switch 1609 has a function of controlling light emission and non-light emission of the lighting portion 1608. Moreover, the switch 1609 can have a function of adjusting the luminance of the lighting portion 1608 when the lighting portion 1608 emits light.

The handheld light illustrated in FIG. 15E can illuminate the surroundings when the lighting portion 1608 is made to emit light by the switch 1609; thus, the visibility of the surroundings can be increased. In addition, the lighting device, which is one embodiment of the present invention, includes a surface light source, components such as a light reflector can be reduced as compared to the case of using a point light source.

Note that in this embodiment, what is illustrated in the drawing can be freely combined with or replaced with what is described in any of other embodiments as appropriate.

This application is based on Japanese Patent Application serial No. 2009-066899 filed with Japan Patent Office on Mar. 18, 2009, the entire contents of which are hereby incorporated by reference.

EXPLANATION OF REFERENCE

100: lighting device, 101: control circuit portion, 102: surface light source portion, 103: lighting switch, 104: alternating-current power supply, 105: rectifier and smoothing circuit, 106: constant voltage circuit, 107: luminance adjustment circuit, 108: variable current source circuit, 109: light-emitting element, 111: base portion, 112: round-shaped light source portion, 113: terminal portion, 201: substrate, 202: electrode, 203: organic EL layer, 204: electrode, 205: light, 206: base, 207: insulating portion, 208: electrode, 301: transformer, 302: rectifier circuit, 303: capacitor, 304: lighting time measurement circuit, 305: correction circuit, 306: accumulated lighting time storage portion, 307: degradation correction storage circuit portion, 308: D/A converter, 404: direct-current power supply, 501: temperature sensor, 502: luminance setting circuit, 601: current mirror circuit, 602: transistor, 701: detachment detection circuit, 801: curve, 802: curve, 803: curve, 901: substrate, 902: insulating film, 904: electrode, 906: organic EL layer, 908: electrode, 909: opening portion, 910: insulating film, 911: auxiliary wiring, 912: connection portion, 913: auxiliary wiring, 914: connection portion, 915: opening portion, 930: round-shaped light source portion, 932: light-emitting element, 950: base portion, 952: control circuit, 954: connection wiring, 956: connection wiring, 957: anisotropic conductive paste, 958: extraction wiring, 960: extraction wiring, 1001: anode, 1002: cathode, 1003: organic EL layer, 1004: intermediate layer, 1011: hole-injecting layer, 1012: hole-transporting layer, 1013: light-emitting element, 1014: electron-transporting layer, 1015: electron-injecting layer, 1301: ceiling lighting device, 1302: wall lighting device, 1303: desk lighting device, 1400: headlight, 1401: lighting device, 1402: power supply connector, 1403: reflector, 1500: traffic light, 1501: lighting portion, 1502: lighting portion, 1503: lighting portion, 1510: emergency exit light, 1601: housing, 1602: lighting portion, 1603: utility pole, 1604: power transmission line, 1605: mounting portion, 1606: lighting portion, 1607: housing, 1608: lighting portion, 1609: switch.

The invention claimed is:

1. A lighting device comprising:
   a surface light source portion including an organic EL element; and
   a control circuit portion provided in a base portion,
   wherein the control circuit portion includes:
     a luminance adjustment circuit configured to store an accumulated lighting time obtained by counting a lighting time of the organic EL element and control luminance of the organic EL element in accordance with the accumulated lighting time; and
     a variable current source circuit configured to supply a current to the organic EL element by control of the luminance adjustment circuit.

2. The lighting device according to claim 1, further comprising a temperature sensor in the luminance adjustment circuit,
   wherein the luminance adjustment circuit is configured to control luminance of the organic EL element in response to a signal from the temperature sensor.

3. The lighting device according to claim 1, further comprising a luminance setting circuit in the luminance adjustment circuit,
   wherein the luminance adjustment circuit is configured to control luminance of the organic EL element in response to a luminance level set by the luminance setting circuit.

4. The lighting device according to claim 1, further comprising a D/A convertor in the luminance adjustment circuit.

5. The lighting device according to claim 1, wherein the surface light source portion has a round shape.

6. The lighting device according to claim 1, wherein the surface light source portion comprises a substrate including an opening portion.

7. The lighting device according to claim 1, wherein the surface light source portion and the control circuit portion can be attached to and detached from each other.

8. The lighting device according to claim 7, further comprising a detachment detection circuit in the luminance adjustment circuit,
   wherein the detachment detection circuit is configured to initialize the accumulated lighting time.

9. A lighting device comprising:
   a surface light source portion including an organic EL element; and
   a control circuit portion provided in a base portion, the control circuit portion including:
     a rectifier and smoothing circuit configured to convert an alternating-current power supply voltage into a pulsating direct-current voltage;
     a constant voltage circuit configured to convert the pulsating direct-current voltage obtained by the rectifier and smoothing circuit into a constant voltage signal;
     a luminance adjustment circuit configured to store an accumulated lighting time obtained by counting a lighting time of the organic EL element in accordance with the constant voltage signal output from the constant voltage circuit, and output degradation correction data corresponding to the accumulated lighting time; and
     a variable current source circuit configured to supply a current to the organic EL element by control of the luminance adjustment circuit.

10. The lighting device according to claim 9, further comprising a temperature sensor in the luminance adjustment circuit,
    wherein the luminance adjustment circuit is configured to control luminance of the organic EL element in response to a signal from the temperature sensor.

11. The lighting device according to claim 9, further comprising a D/A convertor in the luminance adjustment circuit.

12. The lighting device according to claim 9, further comprising a luminance setting circuit in the luminance adjustment circuit,
    wherein the luminance adjustment circuit is configured to control luminance of the organic EL element in response to a luminance level set by the luminance setting circuit.

13. The lighting device according to claim 9, wherein the surface light source portion comprises a substrate including an opening portion.

14. The lighting device according to claim 9, wherein the surface light source portion has a round shape.

15. The lighting device according to claim 9, wherein the surface light source portion and the control circuit portion can be attached to and detached from each other.

16. The lighting device according to claim 15, further comprising a detachment detection circuit in the luminance adjustment circuit,
    wherein the detachment detection circuit is configured to initialize the accumulated lighting time.

17. A lighting device comprising:
    a surface light source portion including an organic EL element; and
    a control circuit portion provided in a base portion, the control circuit portion including:
      a rectifier and smoothing circuit configured to convert an alternating-current power supply voltage into a pulsating direct-current voltage;
      a constant voltage circuit configured to convert the pulsating direct-current voltage obtained by the rectifier and smoothing circuit into a constant voltage signal;
      a luminance adjustment circuit including:
        a lighting time measurement circuit configured to count a lighting time of the organic EL element in accordance with the constant voltage signal output from the constant voltage circuit,
        an accumulated lighting time storage portion configured to store an accumulated lighting time obtained by accumulating the lighting time,
        a degradation correction storage circuit portion configured to store a degradation correction table including degradation correction data with which luminance of the organic EL element is set to predetermined luminance in response to the accumulated lighting time, and
        a correction circuit configured to update and read the accumulated lighting time, and read and output the degradation correction data corresponding to the accumulated lighting time; and
      a variable current source circuit configured to supply a current to the organic EL element by control of the luminance adjustment circuit.

18. The lighting device according to claim 17, further comprising a temperature sensor in the luminance adjustment circuit,
    wherein the luminance adjustment circuit is configured to control luminance of the organic EL element in response to a signal from the temperature sensor.

19. The lighting device according to claim 17, further comprising a luminance setting circuit in the luminance adjustment circuit,
    wherein the luminance adjustment circuit is configured to control luminance of the organic EL element in response to a luminance level set by the luminance setting circuit.

20. The lighting device according to claim 17, further comprising a D/A convertor in the luminance adjustment circuit.

21. The lighting device according to claim 17, wherein the surface light source portion and the control circuit portion can be attached to and detached from each other.

22. The lighting device according to claim 17, wherein the surface light source portion has a round shape.

23. The lighting device according to claim 17, wherein the surface light source portion comprises a substrate including an opening portion.

24. The lighting device according to claim 21, further comprising a detachment detection circuit in the luminance adjustment circuit,
    wherein the detachment detection circuit is configured to initialize the accumulated lighting time.

\* \* \* \* \*

UNITED STATES PATENT AND TRADEMARK OFFICE
CERTIFICATE OF CORRECTION

PATENT NO. : 8,441,209 B2
APPLICATION NO. : 12/722062
DATED : May 14, 2013
INVENTOR(S) : Shunpei Yamazaki and Jun Koyama It is certified that error appears in the above-identified patent and that said Letters Patent is hereby corrected as shown below:

In the Specification:

Column 10, Line 56; Change "fowled" to --formed--.
Column 11, Line 36; Change "found" to --formed--.
Column 17, Line 35; Change "fowled" to --formed--.
Column 19, Line 16; Change "N'-diphenyl-1',1'-biphenyl]" to --N'-diphenyl-[1,1'-biphenyl]--.
Column 20, Line 49; Change "(1BP)," to --(TBP),--.
Column 22, Line 8; Change ")-24p" to --)-2-[p--.
Column 24, Line 9; Change "limning" to --forming--.

Signed and Sealed this
Third Day of September, 2013

Teresa Stanek Rea
*Acting Director of the United States Patent and Trademark Office*